United States Patent
Kenthapadi et al.

(10) Patent No.: US 10,535,018 B1
(45) Date of Patent: Jan. 14, 2020

(54) MACHINE LEARNING TECHNIQUE FOR RECOMMENDATION OF SKILLS IN A SOCIAL NETWORKING SERVICE BASED ON CONFIDENTIAL DATA

(71) Applicant: Microsoft Technology Licensing, LLC, Redmond, WA (US)

(72) Inventors: Krishnaram Kenthapadi, Sunnyvale, CA (US); Stuart MacDonald Ambler, Longmont, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 478 days.

(21) Appl. No.: 15/338,657

(22) Filed: Oct. 31, 2016

(51) Int. Cl.
| | |
|---|---|
| *G06F 17/30* | (2006.01) |
| *G06F 7/00* | (2006.01) |
| *G06N 20/00* | (2019.01) |
| *G06F 21/62* | (2013.01) |
| *G06F 21/60* | (2013.01) |
| *G06Q 50/00* | (2012.01) |

(52) U.S. Cl.
CPC ........... *G06N 20/00* (2019.01); *G06F 21/602* (2013.01); *G06F 21/6245* (2013.01); *G06Q 50/01* (2013.01)

(58) Field of Classification Search
CPC ... G06F 21/6245; G06F 21/602; G06N 20/00; G06Q 50/01
USPC .......................................................... 706/12
See application file for complete search history.

(56) References Cited

U.S. PATENT DOCUMENTS

| | | |
|---|---|---|
| 6,587,832 B1 | 7/2003 | Beck et al. |
| 8,346,865 B1 | 1/2013 | Lin et al. |
| 2004/0024606 A1 | 2/2004 | Chukwu |
| 2012/0042264 A1 | 2/2012 | Burckart et al. |
| 2012/0069131 A1* | 3/2012 | Abelow ............... G06Q 10/067 348/14.01 |
| 2012/0197733 A1 | 8/2012 | Skomoroch et al. |
| 2013/0054687 A1 | 2/2013 | Darwish |
| 2013/0124449 A1 | 5/2013 | Pinckney et al. |
| 2014/0195466 A1* | 7/2014 | Phillipps ................ G06Q 10/04 706/12 |
| 2014/0278821 A1* | 9/2014 | McConnell ........ G06Q 10/0639 705/7.38 |
| 2015/0039541 A1 | 2/2015 | Kapur et al. |
| 2015/0193699 A1 | 7/2015 | Kil et al. |

(Continued)

OTHER PUBLICATIONS

"Non Final Office Action Issued in U.S. Appl. No. 15/338,748", dated May 30, 2019, 10 pages.

(Continued)

*Primary Examiner* — Kuen S Lu
(74) *Attorney, Agent, or Firm* — Schwegman Lundberg & Woessner, P.A.

(57) ABSTRACT

In an example embodiment, each of a plurality of members of a social networking service is mapped to a weighted skill vector, each weighted skill vector including a list of skills for the member with an associated weight indicating a strength of the skill. Members of the social networking service who belong to an industry are aggregated to obtain a weighted matrix of members and skills along with compensation vectors indicating compensation for each of the members in the matrix. The weighted matrix of members and skills and corresponding compensation vectors are used to train a machine learning skill monetary value prediction model to output a predicted monetary value for a skill contained in a candidate vector fed to the machine learning skill monetary value prediction model. A recommendation is provided to a member of one or more skills to add based on output of the model.

20 Claims, 20 Drawing Sheets

(56) References Cited

U.S. PATENT DOCUMENTS

| | | |
|---|---|---|
| 2015/0242653 A1* | 8/2015 | Provost .................. G06Q 30/02 726/26 |
| 2015/0248739 A1 | 9/2015 | Schulman et al. |
| 2016/0055322 A1* | 2/2016 | Thomas .................. G06F 21/10 726/7 |
| 2016/0180248 A1* | 6/2016 | Regan ...................... G09B 5/00 706/12 |
| 2017/0017899 A1 | 1/2017 | Maor et al. |
| 2017/0076244 A1* | 3/2017 | Bastide ................ G06F 16/288 |
| 2017/0148083 A1 | 5/2017 | Yu |
| 2017/0161685 A1 | 6/2017 | Jennings |
| 2017/0236215 A1 | 8/2017 | Eisen et al. |

OTHER PUBLICATIONS

"Final Office Action Issued in U.S. Appl. No. 15/338,773", dated May 31, 2019, 41 Pages.

"Non Final Office Action Issued in U.S. Appl. No. 15/338,773", dated Dec. 12, 2018, 36 Pages.

"Response Filed in U.S. Appl. No. 15/338,773", Filed Date: Feb. 19, 2019, 14 Pages.

"Response Filed in U.S. Appl. No. 15/338,773", Filed Date: Jul. 30, 2019, 12 Pages.

Linden, et al., "Amazon.com Recommendations: Item-to-Item Collaborative Filtering", In Journal of IEEE Internet Computing, vol. 7, Issue 1, Jan. 1, 2003, pp. 76-80.

Stewart, James B.., "New Metric for Colleges: Graduates' Salaries", In the New York Times, Sep. 13, 2013, 5 Pages.

"Examiner Interview Summary Issued in U.S. Appl. No. 15/338,773", dated Jan. 24, 2019, 4 Pages.

"Examiner Interview Summary Issued in U.S. Appl. No. 15/338,773", dated Aug. 5, 2019, Pages.

* cited by examiner

| CONFIDENTIAL DATA 402 | MEMBER ID 404 | TIMESTAMP 406 | FIRST ATTRIBUTE 408 | SECOND ATTRIBUTE 410 |
|---|---|---|---|---|
| XXX | YYY | 5/31/16 04:15:15 | SAN FRANCISCO | SOFTWARE ENGINEER |
| XXX | YYY | 5/31/16 10:15:12 | LOS ANGELES | SOFTWARE ENGINEER |
| XXX | YYY | 6/1/16 01:12:12 | LOS ANGELES | PRODUCT MANAGER |
| XXX | YYY | 6/2/16 23:15:59 | DALLAS | VICE PRESIDENT, SALES |
| XXX | YYY | 6/3/16 05:43:12 | NEW YORK | HR BUSINESS PARTNER |

MACHINE LEARNING TECHNIQUE FOR RECOMMENDATION OF SKILLS IN A SOCIAL NETWORKING SERVICE BASED ON CONFIDENTIAL DATA

TECHNICAL FIELD

The present disclosure generally relates to computer technology for solving technical challenges in the use of confidential data in a computer system. More specifically, the present disclosure relates to a machine learning technique for recommendation of skills in a social networking service based on confidential data.

BACKGROUND

In various types of computer systems, there may be a need to collect, maintain, and utilize confidential data. In some instances, users may be reluctant to share this confidential data over privacy concerns. These concerns extend not only to pure security concerns, such as concerns over whether third parties such as hackers may gain access to the confidential data, but also to how the computer system itself may utilize the confidential data. With certain types of data, users providing the data may be somewhat comfortable with uses of the data that maintain anonymity, such as the confidential data merely being used to provide broad statistical analysis to other users.

One example of such confidential data is salary/compensation information. It may be desirable for a service such as a social networking service to entice its members to provide information about their salary or other work-related compensation in order to provide members with insights as to various metrics regarding salary/compensation, such as an average salary for a particular job type in a particular city. There are technical challenges encountered, however, in ensuring that such confidential data remains confidential and is only used for specific purposes, and it can be difficult to persuade members to provide such confidential data due to their concerns that these technical challenges may not be met. Once the confidential data is acquired, it can be utilized for a variety of different statistical insights that can be presented to users. It would be desirable, however, to also utilize the confidential data to make various recommendations to the user, but such recommendations present technical challenges in that it is difficult for a computer to predict along a particular dimension while simultaneously correcting for the confidential data.

BRIEF DESCRIPTION OF THE DRAWINGS

Some embodiments of the technology are illustrated, by way of example and not limitation, in the figures of the accompanying drawings.

DETAILED DESCRIPTION

The present disclosure describes, among other things, methods, systems, and computer program products. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, an architecture is provided that gathers confidential information from users, tracks the submission of the confidential information, and maintains and utilizes the confidential information in a secure manner. Furthermore, the architecture is able to make accurate predictions for users based on the submitted confidential information.

Figure 1:
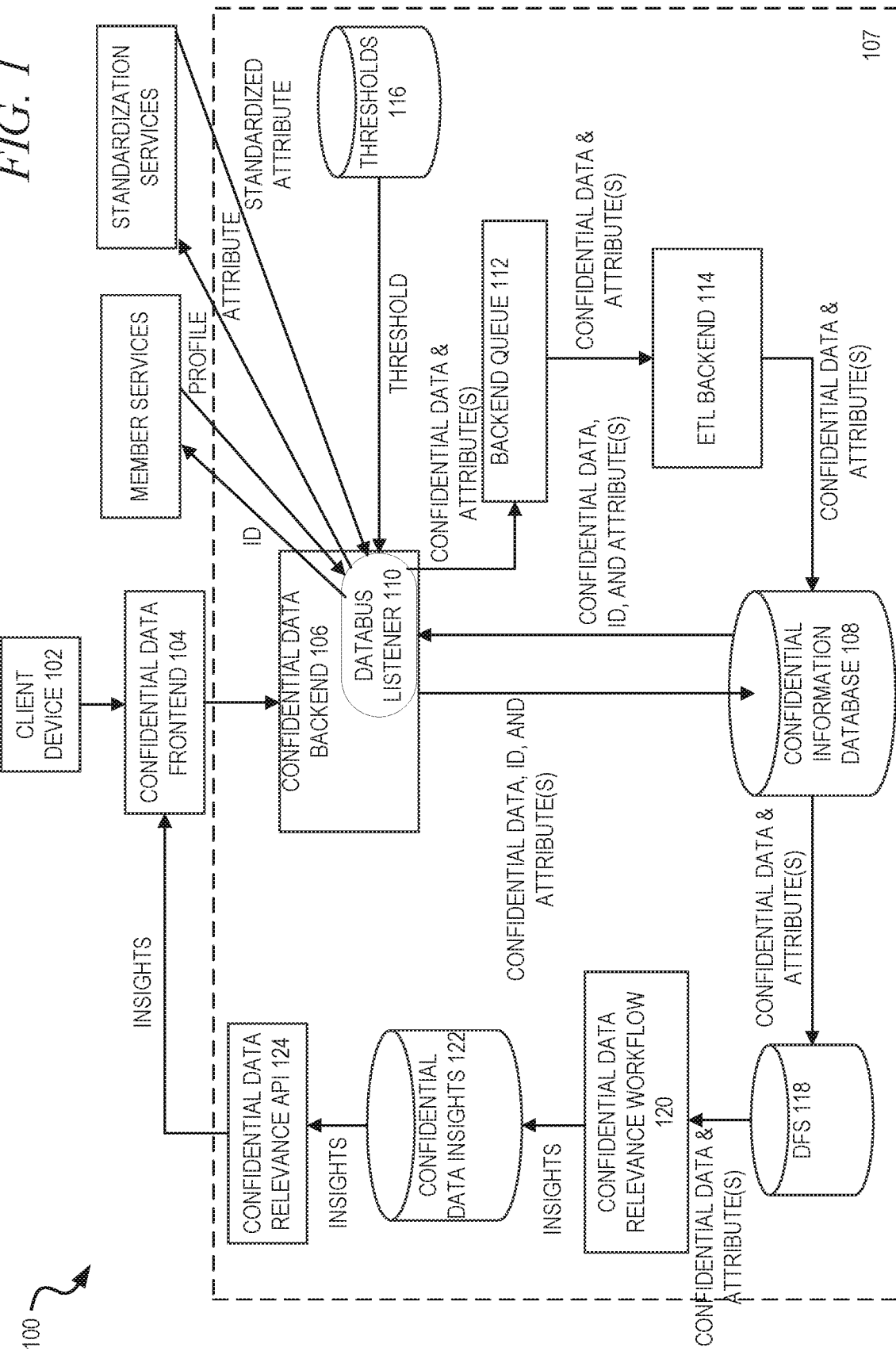
FIG. 1 is a block diagram illustrating a confidential data collection, tracking, and usage system, in accordance with an example embodiment.

FIG. 1 is a block diagram illustrating a confidential data collection, tracking, and usage system 100, in accordance with an example embodiment. A client device 102 may utilize a confidential data frontend 104 to submit confidential information to a confidential data backend 106. In some example embodiments, the confidential data backend 106 is located on a server-side or cloud platform 107 while the confidential data frontend 104 is directly connected to or embedded in the client device 102. However, in some example embodiments, the confidential data frontend 104 is also located on the server-side or cloud platform 107.

There may be various different potential implementations of the confidential data frontend 104, depending upon the type and configuration of the client device 102. In an example embodiment, the confidential data frontend 104 may be a web page that is served to a web browser operating on the client device 102. The web page may include various scripts, such as Javascript code, in addition to Hypertext Markup Language (HTML) and Cascading Style Sheets (CSS) code designed to perform various tasks that will be described in more detail below. The web page may be served in response to a user selecting a link in a previous communication or web page. For example, the link may be displayed in an email communication to the user, or as part of a feed section of the user's social networking service member page. This allows the entity operating the confidential data collection, tracking, and usage system 100 to selectively target users to request that they submit confidential information. For example, the entity may determine that there is a need to obtain more salary information for users from Kansas and then may send out communications to, or cause the social networking service to alter feeds of, users from Kansas in a manner that allows the users to select the link to launch the confidential data frontend 104.

In another example embodiment, the confidential data frontend 104 may be built into an application installed on the client device 102, such as a standalone application running on a smartphone. Again this confidential data frontend 104 is designed to perform various tasks that will be described in more detail below.

One task that the confidential data frontend 104 may be designed to perform is the gathering of confidential data from a user of the client device 102. Another task that the confidential data frontend 104 may be designed to perform is to display insights from confidential data contributed by other users. In order to incentivize users to provide certain types of confidential data, in an example embodiment, insights from the confidential data contributed by other users are provided in response to the user contributing his or her own confidential data. As will be described in more detail, a mechanism to ensure that the contribution of confidential data is tracked is provided.

Once the confidential data is received from the user, the confidential data frontend 104 may transmit the confidential data along with an identification of the user (such as a member identification reflecting the user's account with a social networking service) to the confidential data backend 106. In an example embodiment, this may be performed via, for example, a Representational State Transfer (REST) Application Program Interface (API).

The confidential data, along with the identification of the user, may be stored in a submission table by the confidential data backend 106 in a confidential information database 108. In some example embodiments, this submission table may be encrypted in order to ensure security of the information in the submission table. Furthermore, in some example embodiments, the confidential data stored in the submission table may be encrypted using a different key than the identifying information in the submission table. This encryption will be described in more detail below.

In another example embodiment, a random transaction number is generated for each confidential data submission. This random transaction number is stored with the identifying information in one table, and then stored with the confidential data in another table, with each table encrypted separately using a different key. In either this example embodiment or the previous example embodiment, encrypting the identifying information separately from the confidential data (either in one table or in separate tables) provides added security against the possibility that a malicious user could gain access to one or the other. In other words, even if a malicious user gained access to the identifying information by, for example, hacking the encryption used to encrypt the identifying information, that would not allow the malicious user to gain access to the confidential data corresponding to the identifying information, and vice versa. In an example embodiment, the encryption mechanism used is one that is non-deterministic, such that the same information encrypted twice would produce different results in each encryption. In another example embodiment, the transaction number itself is also encrypted, thereby preventing even the act of joining separate tables containing the identifying information and the confidential data.

In an example embodiment, a submission table may also be able to track when submissions were made by users. As such, the submission table may include additional columns such as, for example, a submission identification, an identification of the user who made the submission, an encryption key for the submission, and timestamp information about when the submission was made. The submission table may then be utilized by the confidential data backend 106 to determine, for example, when to share insights from submissions from other users with a particular user. If, for example, the user has previously submitted confidential data and has done so recently (e.g., within the last year), then the confidential data backend 106 may indicate to the confidential data frontend 104 that it should share insights from confidential data from other users with this particular user.

There may be other methods than those described above for determining eligibility of a user for receiving insights from submissions from other users. For example, a predicate expressed in terms of one or more attributes may need to be satisfied in order to receive the insights, such as particular demographic or profile-based attributes. These attributes can include any such attribute, from location to title, to level of skill, to social networking service activities or status (e.g., about to transition from being an active member to an inactive member), to transactional attributes (e.g., purchased a premium subscription).

Additionally, any combination of the above factors can be used to determine whether the user is eligible for receiving insights from submissions from other users.

Furthermore, the submission table may also include one or more attributes of the user who made the submission. These attributes may be attributes that can be useful in determining a slice to which the user belongs. Slices will be described in more detail below, but generally involve a segment of users sharing common attributes, such as titles, locations, educational levels, and the like. It should be noted that it is not necessary for these attributes to be stored in the submission table. Since an identification of the user is available in the submission table, it may be possible to retrieve the attributes for the user on an as-needed basis, such as by querying a social networking service with the user identification when needed.

A databus listener 110 detects when new confidential data is added to the confidential information database 108 and triggers a workflow to handle the new confidential data. First, the databus listener 110 queries a thresholds data store 116 to determine if one or more thresholds for anonymization have been met. Specifically, until a certain number of data points for confidential data have been met, the confidential data collection, tracking, and usage system 100 will not act upon any particular confidential data data point. As will be described in more detail later, these thresholds may be created on a per-slice basis. Each slice may define a segment of users about whom insights may be gathered based on data points from confidential data submitted by users in the slice. For example, one slice may be users with the title "software engineer" located in the "San Francisco Bay Area." If, for example, the confidential data is compensation information, then it may be determined that in order to gain useful insights into the compensation information for a particular title in a particular region, at least ten data points (e.g., compensation information of ten different users) are needed. In this case, the threshold for "software engineer" located in "San Francisco Bay Area" may be set at ten. The databus listener 110, therefore, is designed to retrieve the confidential data added to the confidential information database 108, retrieve the threshold for the slice corresponding to attributes of the user (as stored, for example, in the submission table in the confidential information database 108 or retrieved at runtime from a social networking service), determine if the new data point(s) cause the threshold for the corresponding slice to be exceeded, and, if so, or if the threshold had already been exceeded, insert the data in a backend queue 112 for extract, transform, and load (ETL) functions.

In an example embodiment, the thresholds data store 116 contains not just the thresholds themselves but also a running count of how many data points have been received for each slice. In other words, the thresholds data store 116 indicates how close the slice is to having enough data points with which to provide insights. The databus listener 110 may reference these counts when making its determination that a newly submitted data point causes a threshold to be exceeded. Running counts of data points received for each slice are updated in the thresholds data store 116 by the confidential data backend 106.

Since the databus listener 110 only transfers data points for a particular slice to the backend queue 112 once the threshold for that slice has been exceeded, the confidential data data points corresponding to that slice may need to be retrieved from the confidential information database 108 once the threshold is determined to be exceeded. For example, if, as above, the threshold for a particular slice is ten data points, the first nine data points received for that slice may simply be left in the confidential information database 108 and not sent to the backend queue 112. Then, when the tenth data point for the slice is stored in the confidential information database 108, the databus listener 110 may determine that the threshold has been exceeded and retrieve all ten data points for the slice from the confidential information database 108 and send them to the backend queue 112 for processing.

It should be noted that the information obtained by the databus listener 110 from the confidential information database 108 and placed in the backend queue 112 is anonymized. In an example embodiment, no identification of the users who submitted the confidential data is provided to the backend queue 112. Indeed, in some example embodiments, the information provided to the backend queue 112 may simply be the confidential data itself and any information needed in order to properly group the confidential data in one or more slices. For example, if slices are designed to group user confidential data based only on user title, location, and years of experience, other attributes for the user that might have been stored in the confidential information database 108, such as schools attended, may not be transferred to the backend queue 112 when the confidential data tied to those attributes is transferred to the backend queue 112. This further helps to anonymize the data, as it makes it more difficult for people to be able to deduce the identity of a user based on his or her attributes.

It should also be noted that any one piece of confidential data may correspond to multiple different slices, and thus the databus listener 110 may, in some example embodiments, provide the same confidential data to the backend queue 112 multiple times. This can occur at different times as well, because each of the slices may have its own threshold that may be exceeded at different times based on different counts. Thus, for example, compensation data for a user in the "San Francisco Bay Area" with a job title of "software developer" and a school attended as "Stanford University" may be appropriately assigned to one slice of software developers in the San Francisco Bay Area, a slice of Stanford University alums, and a slice of software developers in the United States. All slices may have their own thresholds and counts of confidential data from other users, who may or may not have complete overlap with these three slices.

An ETL backend 114 acts to extract, transform, and load the confidential data to anonymize and group it and place it back in the confidential information database 108 in a different location from that where it was stored in non-anonymized form. It should be noted that in some example embodiments, the anonymization described above with respect to the databus listener 110 may actually be performed by the ETL backend 114. For example, the databus listener 110 may send non-anonymized confidential data along with all attributes to the backend queue 112, and it may be the ETL backend 114 that reviews this data and discards certain elements of it to anonymize it.

In an example embodiment, the confidential data is stored in encrypted format in the confidential information database 108 when the databus listener 110 sends it to the backend queue 112. As such, one function of the ETL backend 114 is to decrypt the confidential data. Encryption and decryption of the confidential data will be discussed in more detail below.

The ETL backend 114 writes the anonymized confidential data and slice information into an ETL table corresponding to the slice in the confidential information database 108. As described earlier, this ETL table may be stored in a different location than that in which the confidential data was stored initially, such as the submission table described earlier.

At a later time, and perhaps using a batch or other periodic process, the information from the ETL table may be loaded in a distributed file system (DFS) 118. A confidential data relevance workflow 120 may then extract relevant information from the DFS 118 and provide one or more insights into the relevant information in a confidential data insights data store 122. A confidential data relevance API 124 may then be utilized to provide insights from the confidential data insights data store 122 to the confidential data frontend 104, which can then display them to a user. As described earlier, these insights may be provided only on a "give-to-get" basis, namely that only users who provide confidential information (and/or have provided it recently) can view insights.

Figure 2A:
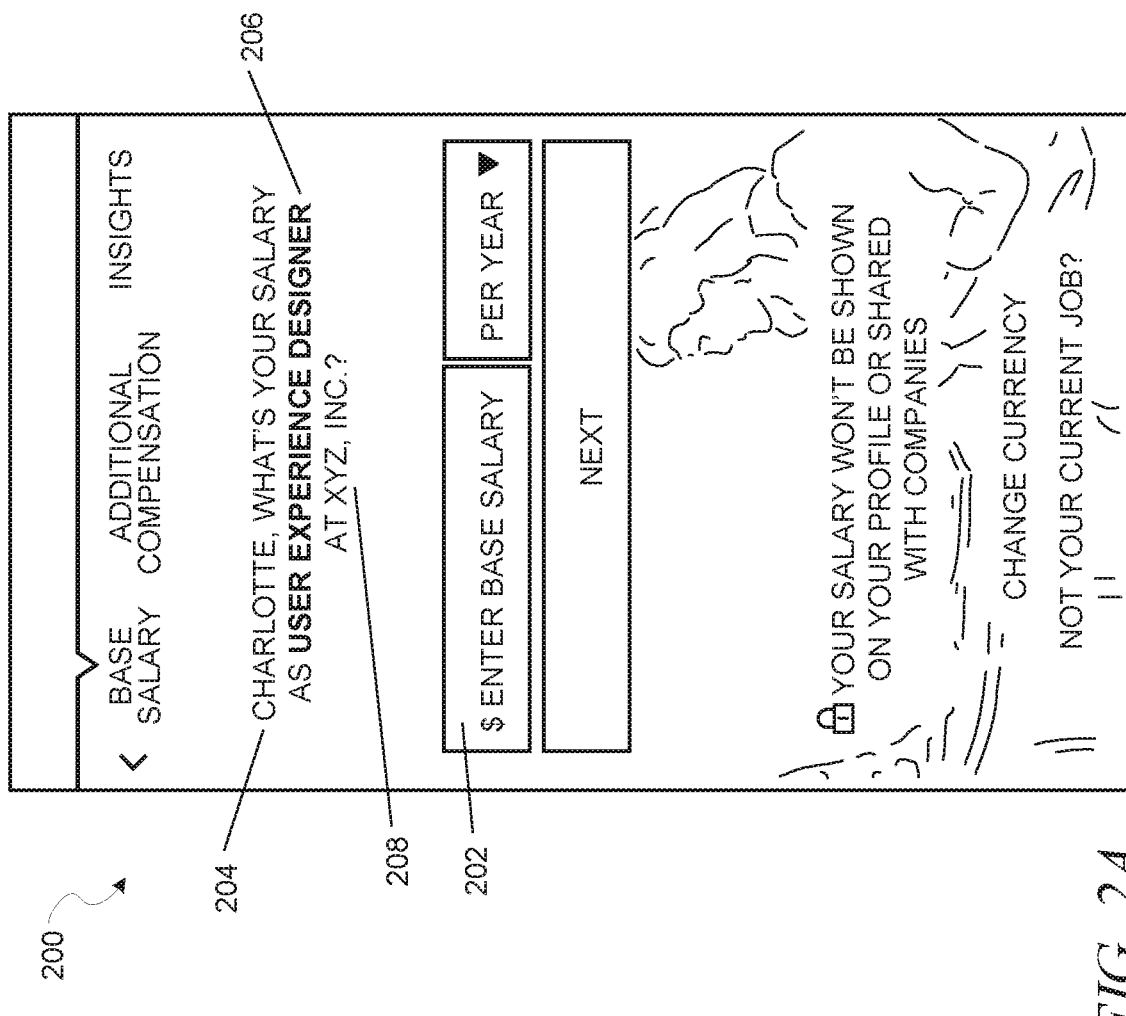
FIGS. 2A-2C are screen captures illustrating an example of a user interface provided by a confidential data frontend, in accordance with an example embodiment.
Figure 2B:
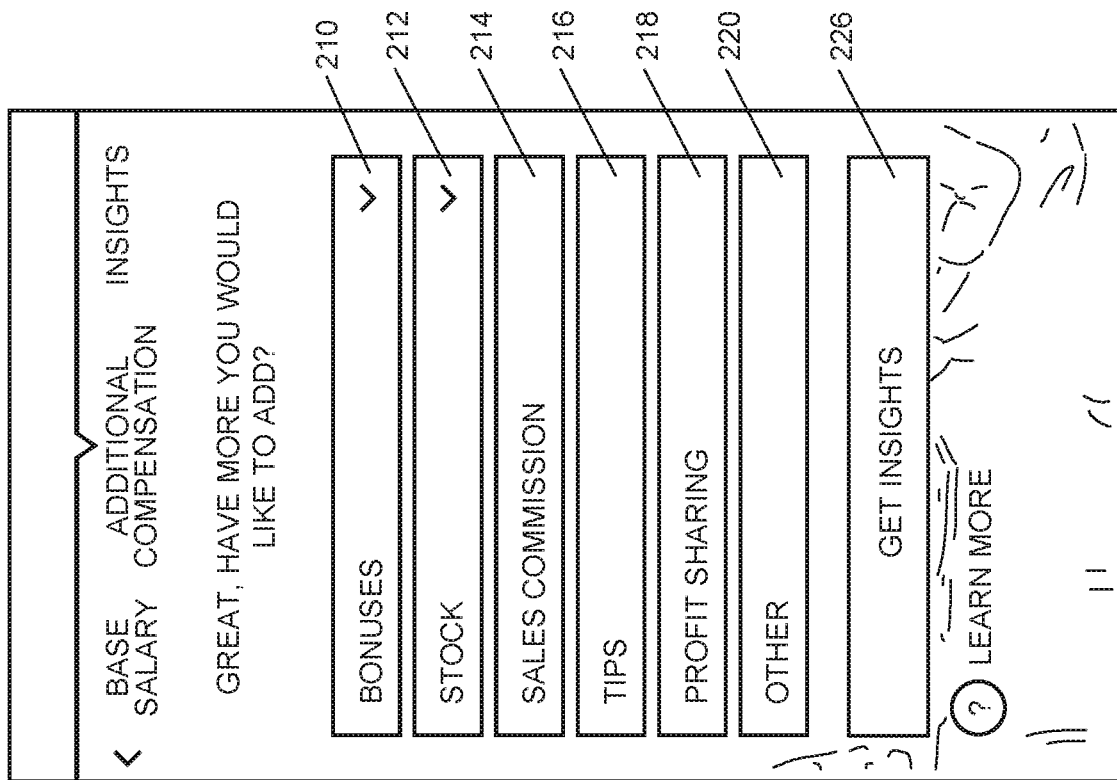
Figure 2C:
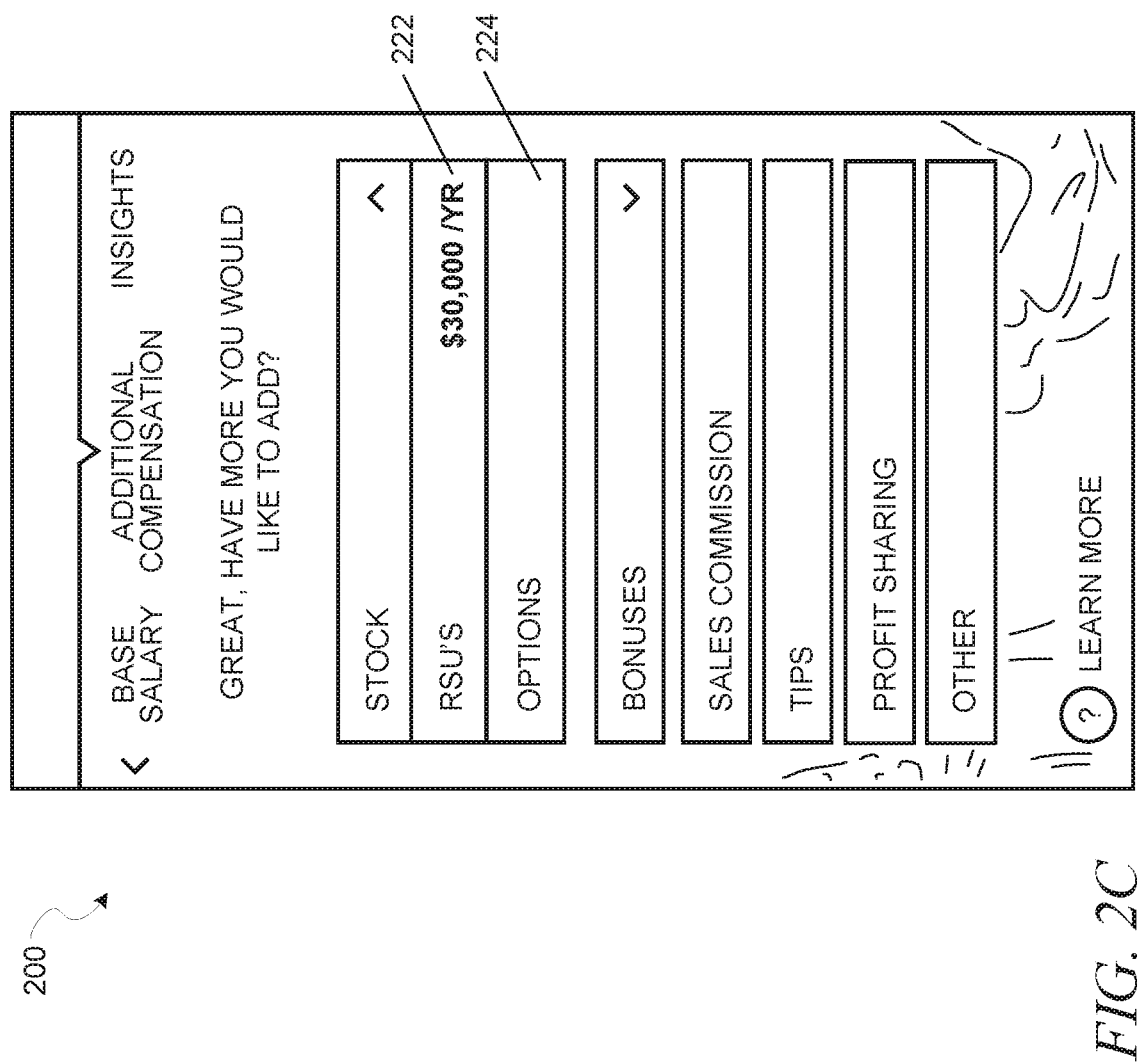

Turning now to more detail about the submission process, FIGS. 2A-2C are screen captures illustrating an example of a user interface 200 provided by the confidential data frontend 104, in accordance with an example embodiment. Referring first to FIG. 2A, the user interface 200 here is depicted as a screen of a standalone application operating on a mobile device, such as a smartphone. In FIG. 2A, the user is prompted to enter a base salary in a text box 202, with a drop-down menu providing options for different time periods by which to measure the base salary (e.g., per year, per month, per hour, etc.). Additionally, the user may be identified by name at 204, the user's title may be identified at 206, and the user's current employer may be identified at 208. This information may be prepopulated into the user interface 200, such as by retrieving this information from a member profile for the user in a social networking service. This eliminates the need for the user to enter this information manually, which can have the effect of dissuading some users from providing the confidential information or completing the submission process, especially on a mobile device where typing or otherwise entering information may be cumbersome.

Turning to FIG. 2B, here the user interface 200 displays a number of other possible compensation types 210-220 from which the user can select. Selecting one of these other possible compensation types 210-220 causes the user interface 200 to provide an additional screen where the user can submit confidential data regarding the selected compensation type 210-220. Here, for example, the user has selected "Stock" 212. Referring now to FIG. 2C, the user interface 200 then switches to this screen, which allows the user to provide various specific details about stock compensation, such as restricted stock unit (RSU) compensation 222 and options 224. The user interface 200 at this stage may also display the other compensation types 210-220 that the user can make additional submissions for.

Referring back to FIG. 2B, when the user has completed entering all the confidential data, such as all the different compensation types appropriate for his or her current job, a "Get insights" button 226 may be selected, which launches a process by which the confidential data backend 106 determines whether the user is eligible to receive insights from confidential data from other users and, if so, indicates to the confidential data backend 106 that the insights should be provided. Additionally, selection of the "Get insights" button 226 represents an indication that the submission of the confidential data by this user has been completed, causing the confidential data backend 106 to store the confidential data in the confidential information database 108 as described below, which then may trigger the databus listener 110 to extract the confidential data and cause the ETL backend 114 to anonymize the confidential data and place it in the appropriate ETL tables corresponding to the appropriate slices in which the confidential data belongs. This permits the submitted confidential data to be available for future insights.

Figure 3:
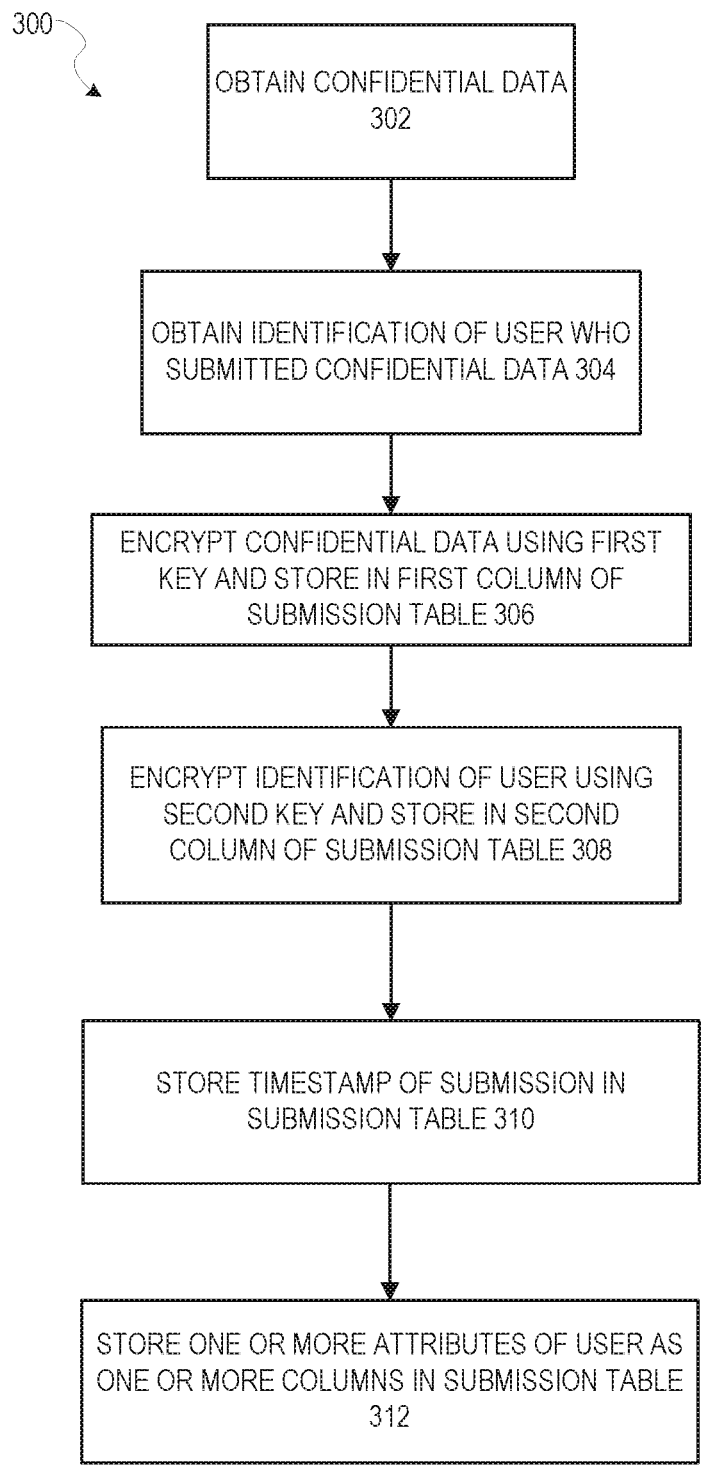
FIG. 3 is a flow diagram illustrating a method for confidential data collection and storage, in accordance with an example embodiment.

FIG. 3 is a flow diagram illustrating a method 300 for confidential data collection and storage, in accordance with an example embodiment. In an example embodiment, the method 300 may be performed by the confidential data backend 106 of FIG. 1. At operation 302, confidential data is obtained. At operation 304, an identification of the user who submitted the confidential data is obtained. It should be noted that while operations 302 and 304 are listed separately, in some example embodiments they may be performed in the same operation. For example, in an example embodiment, the confidential data frontend 104 may, upon receiving an indication from a user that input of confidential data in the confidential data frontend 104 by the user has been completed, forward the inputted confidential data and an identification of the user to the confidential data backend 106. In other example embodiments, however, the operations 302 and 304 may be performed separately. For example, in an example embodiment, the identification of the user may not be obtained directly from the confidential data frontend 104, but rather some other type of identifying information may be obtained directly from the confidential data frontend 104, and this other type of identifying information may be used to query a social networking service or other third-party service for the identification information for the user. Regardless, after operations 302 and 304 have been performed, the confidential data backend 106 has at its disposal some confidential data and identification information for the user who entered the confidential data.

It should be noted that the confidential data may be a single piece of information, or may be multiple related pieces of information. For example, the confidential data may simply include a total compensation value and nothing more, or may include a complete breakdown of different types of compensation (e.g., base salary, bonus, stock, etc.).

Users are understandably concerned about the security of the confidential information, and specifically about a malicious user being able to correlate the confidential information and the identification of the user (i.e., not just learning the confidential information but tying the confidential information specifically to the user). As such, at operation 306, the confidential data is encrypted using a first key and stored in a first column of a submission table in a confidential information database. Then, at operation 308, the identification of the user who submitted the confidential data is separately encrypted using a second key and stored in a second column of the submission table in the confidential information database.

Additionally, a number of optional pieces of information may, in some example embodiments, be stored in the submission table at this point. At operation 310, a timestamp of the submission of the confidential data may be stored in a column in the submission table. This timestamp may be used in, for example, a determination of whether the user is eligible to receive insights from confidential data submitted by other users. At operation 312, one or more attributes of the user may be stored as one or more columns in the submission table. These attributes may be used, for example, in determining to which slice(s) the confidential data may apply, as will be described in more detail below.

Figure 4:
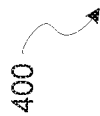
FIG. 4 is a diagram illustrating an example of a submission table, in accordance with an example embodiment.

FIG. 4 is a diagram illustrating an example of a submission table 400, in accordance with an example embodiment. Each row in the submission table 400 corresponds to a different submission. Here, the submission table 400 includes five columns. In a first column 402, confidential data encrypted by a first key is stored. In a second column 404, identification of the user who submitted the corresponding confidential data, encrypted by a second key, is stored. In a third column 406, a timestamp for the submission is stored. In a fourth column 408, a first attribute of the user, here location, is stored. In a fifth column 410, a second attribute of the user, here title, is stored. Of course, there may be additional columns to store additional attributes or other pieces of information related to the submission.

Notably, FIG. 4 depicts an example embodiment where only the first and second columns 402, 404 are encrypted, using different encryption keys. In some example embodiments, the additional columns 406-410 may also be encrypted, either individually or together. In some example embodiments, one or more of these additional columns 406-410 may be encrypted using the same key as the first or second column 402, 404. Furthermore, in some example embodiments, the submission table 400 may be additionally encrypted as a whole, using a third encryption key different from the keys used to encrypt the first and second columns 402, 404.

It should be noted that while FIGS. 3 and 4 describe the confidential data as being stored in a single column in a submission table, in some example embodiments, this column is actually multiple columns, or multiple sub-columns, with each corresponding to a subset of the confidential data. For example, if the confidential data is compensation information, the confidential data may actually comprise multiple different pieces of compensation information, such as base salary, bonus, stock, tips, and the like. Each of these pieces of compensation information may, in some example embodiments, have its own column in the submission table. Nevertheless, the processes described herein with regard to the "column" in which the confidential data is stored apply equally to the embodiments where multiple columns are used (e.g., the individual pieces of compensation information are still encrypted separately from the user identification information).

Figure 5:
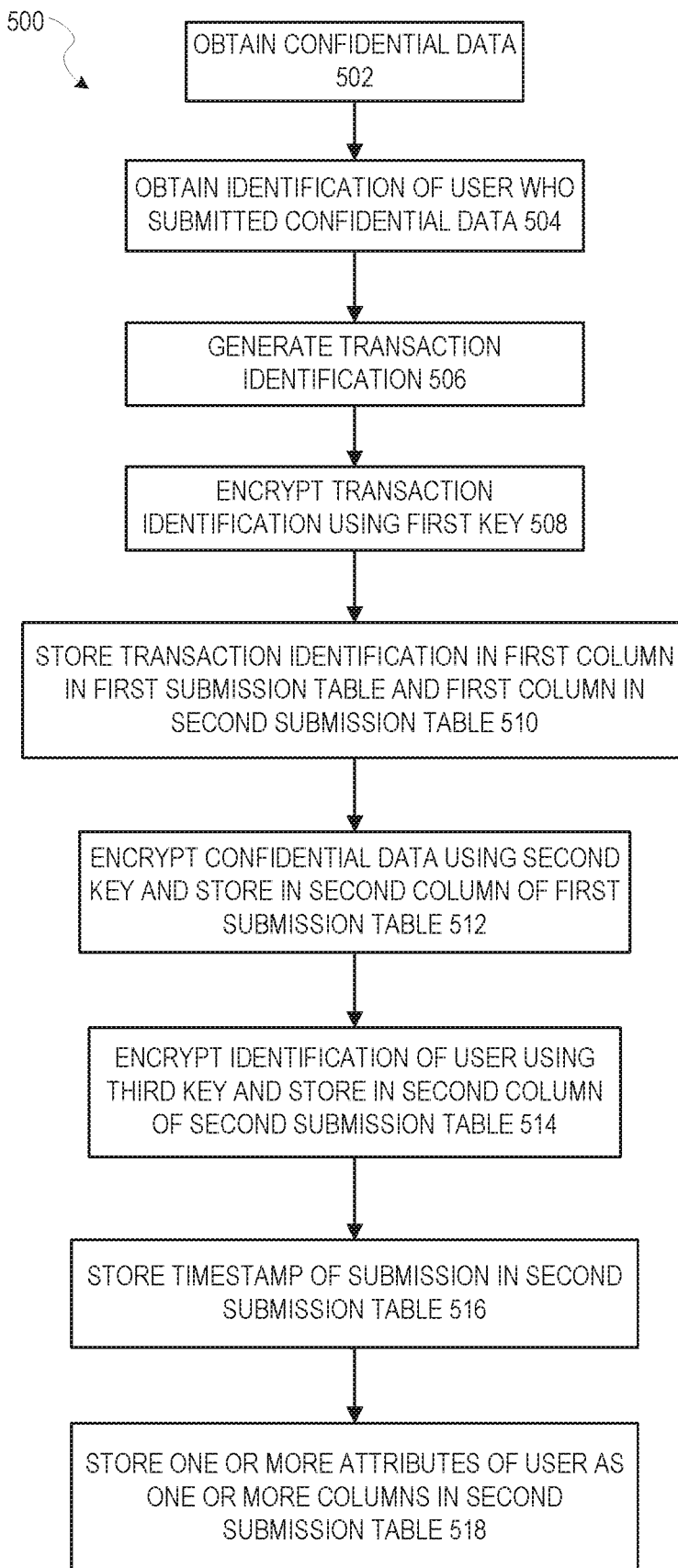
FIG. 5 is a flow diagram illustrating a method for confidential data collection and storage, in accordance with an example embodiment.

FIG. 5 is a flow diagram illustrating a method 500 for confidential data collection and storage, in accordance with an example embodiment. In contrast with FIG. 3, FIG. 5 represents an example embodiment where the confidential data and the identification of the user who submitted the confidential data are stored in separate tables in order to provide additional security. At operation 502, confidential data is obtained. At operation 504, an identification of the user who submitted the confidential data is obtained. As in FIG. 3, while operations 502 and 504 are listed separately, in some example embodiments they may be performed in the same operation.

At operation 506, a transaction identification is generated. This transaction identification may be, for example, a randomly generated number or character sequence that uniquely identifies the submission. At operation 508, the transaction identification may be encrypted using a first key. At operation 510, the transaction identification (either encrypted or not, depending upon whether operation 508 was utilized) is stored in a first column in a first submission table and in a first column in a second submission table in a confidential information database.

At operation 512, the confidential data is encrypted using a second key and stored in a second column of the first submission table in the confidential information database. Then, at operation 514, the identification of the user who submitted the confidential data is separately encrypted using a third key and stored in a second column of the second submission table in the confidential information database.

Additionally, as in FIG. 3, a number of optional pieces of information may, in some example embodiments, be stored in the first and/or second submission tables at this point. At operation 516, a timestamp of the submission of the confidential data may be stored in a column in the second submission table. This timestamp may be used in, for example, a determination of whether the user is eligible to receive insights from confidential data submitted by other users. At operation 518, one or more attributes of the user may be stored as one or more columns in the second submission table. These attributes may be used, for example, in determining to which slice(s) the confidential data may apply, as will be described in more detail below. It should be noted that while operations 516 and 518 are described as placing information in the second submission table, in other example embodiments, one or more of these pieces of information may be stored in the first submission table.

If operation 508 is utilized, then the fact that the transaction identification is encrypted and is the only mechanism by which to link the confidential data in the first submission table with the user identification in the second submission table through a join operation provides an additional layer of security.

In an example embodiment, various predictions may be based in part on the submitted confidential data. When the submitted confidential data is compensation data, for example, a machine learning technique may be utilized to assign monetary values for various user attributes, such as skills. These monetary values can then be used in recommending that certain actions be taken by a user, such as taking a course to improve a particular skill or skills having high monetary value to the user, or moving to a different location to increase the user's compensation.

In a first example embodiment, a monetary value is associated with a weighted combination of skills for a particular user. Once the monetary value is known, a recommendation of top skills to improve may be produced. Turning first to the association of the monetary value with a weighted combination of skills for a particular user, a process may be utilized that takes as input a set of tuples of skill combinations for users and corresponding compensations, and outputs a monetary value for each given weighted skill vector of skills (i.e., combination of skills).

Figure 6:
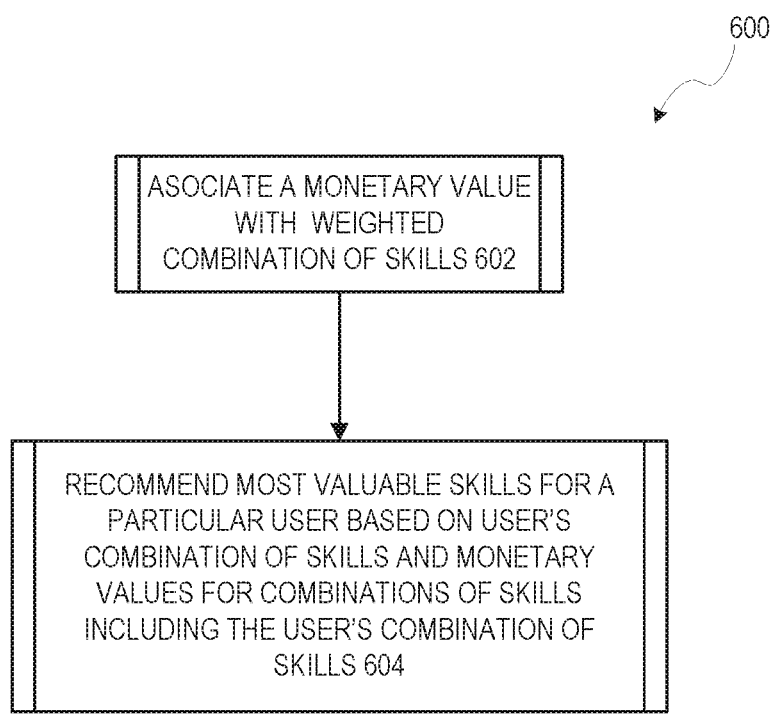
FIG. 6 is a flow diagram illustrating a method of recommending skills to members of a social networking service, in accordance with an example embodiment.

FIG. 6 is a flow diagram illustrating a method 600 of recommending skills to members of a social networking service, in accordance with an example embodiment. At operation 602, a monetary value is associated with a weighted combination of skills. This may involve associating a monetary value with each of a plurality of different weighted combinations of skills. At operation 604, the most-valuable skills for a particular user are recommended, based on the user's combination of skills and the monetary values for combinations of skills including the user's combinations of skills.

Specifically, the input of operation 602 may be a set of $(u, v(u))$ tuples where u is the user identification and $v(u)$ is a compensation value for user u. Notably, the compensation value may be any type of compensation value, e.g., a base or total compensation value. The output is then the monetary value (S) for a given weighted skill vector S= $\{(s1, w1), \ldots, (sn, wn)\}$ of skills.

Figure 7:
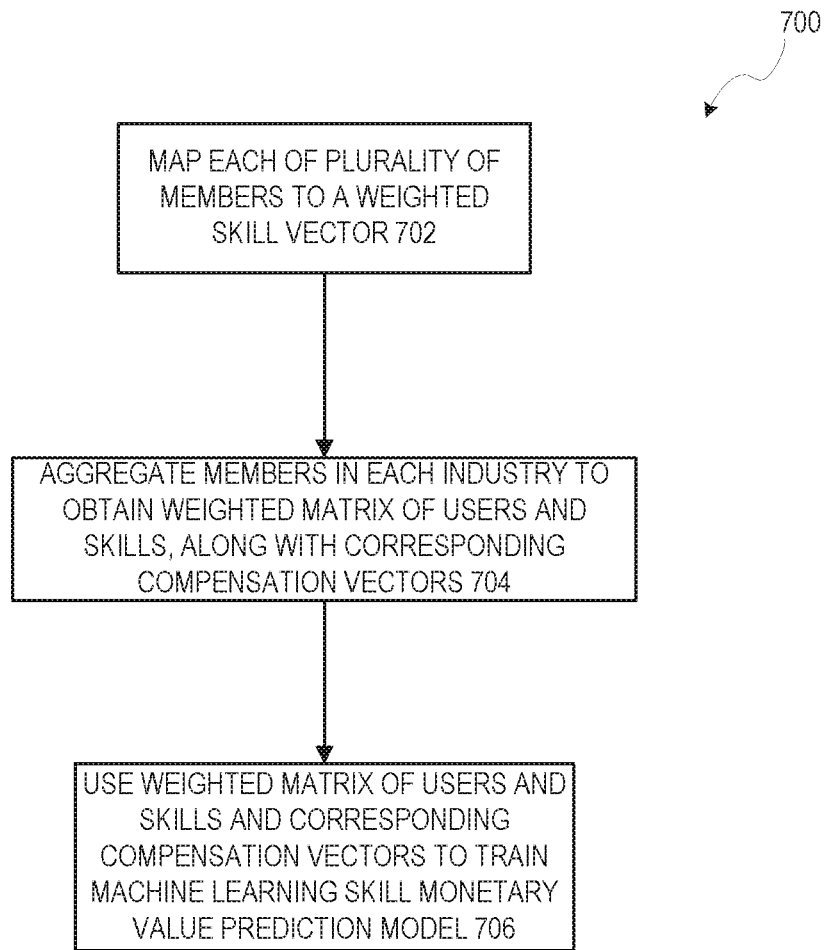
FIG. 7 is a flow diagram illustrating a method of assigning a monetary value to each of a plurality of different weighted combinations of skills, in accordance with an example embodiment.

FIG. 7 is a flow diagram illustrating a method 700 of assigning a monetary value to each of a plurality of different weighted combinations of skills, in accordance with an example embodiment. First, at operation 702, each of a plurality of members is mapped to a weighted skill vector. Each dimension of the skill vector corresponds to a skill, and the weight indicates the extent to which the member possesses the skill. Each member u of the plurality of members is then represented using a weighted skill vector based on skills stated in the member profile for the member. In an alternative example embodiment, for a subset of identified skills, each skill c is associated with an endorsement score (endscore $(u, c)$) based on a number of endorsements of the skill as well as how authoritative the endorsers are (according to a random walk/graph analysis intuition). The subset may be based on a "narrowing down" of skills to skills that typically co-occur together, using, for example, an inferred skills algorithm. Then a set $E(u)$ of most-important skills for user u, along with a corresponding significance score γ(u, c), is identified. This may involve applying a graph analysis algorithm such as PageRank to determine a centrality score φ (u, c) of each skill c, and then boosting this score based on the endorsement score, endscore (u, c), where f' ( . . . ) is a monotonically increasing function in two variables such as f'(x, y)=xy, or f'(x,y)=x exp(y). This utilizes not just the endorsements but also a measure of how authoritative the endorsers are.

Figure 8:
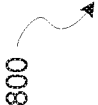
FIG. 8 is a diagram illustrating an example matrix, in accordance with an example embodiment.

At operation 704, members in each industry are aggregated to obtain a weighted matrix of users and skills, along with the corresponding compensation vectors. FIG. 8 is a diagram illustrating an example matrix 800, according to an example embodiment. The matrix 800 includes a column 802 for users, columns 804A-804H for each skill, and a column 806 for compensation (representing the compensation vector). Each skill in the columns 804A-804H has a corresponding weight for each user in the column 802. It should be noted that while only eight skills are depicted here, in an example embodiment the number of skills may be set at any amount, and in fact in typical social networking services the skills could number in the hundreds or thousands.

Referring back to FIG. 7, at operation 706, the weighted matrix of users and skills and corresponding compensation vectors are used to train a machine learning model, such as a logistical regression machine learning skill monetary value model. In other example embodiments, skills are mapped to a low-dimensional space (since many skills may be related or synonymous). Denoting a number of users by n and a number of skills by m, an m×k dimensionality reduction matrix M may be derived using a dimensionality reduction technique, such as Singular Value Decomposition (SVD), Linear Discriminant Analysis (LDA), or random projection, where k is less than n. The machine learning skill monetary value model may then be trained with respect to the low-dimensional space, returning S(M).

Figure 9:
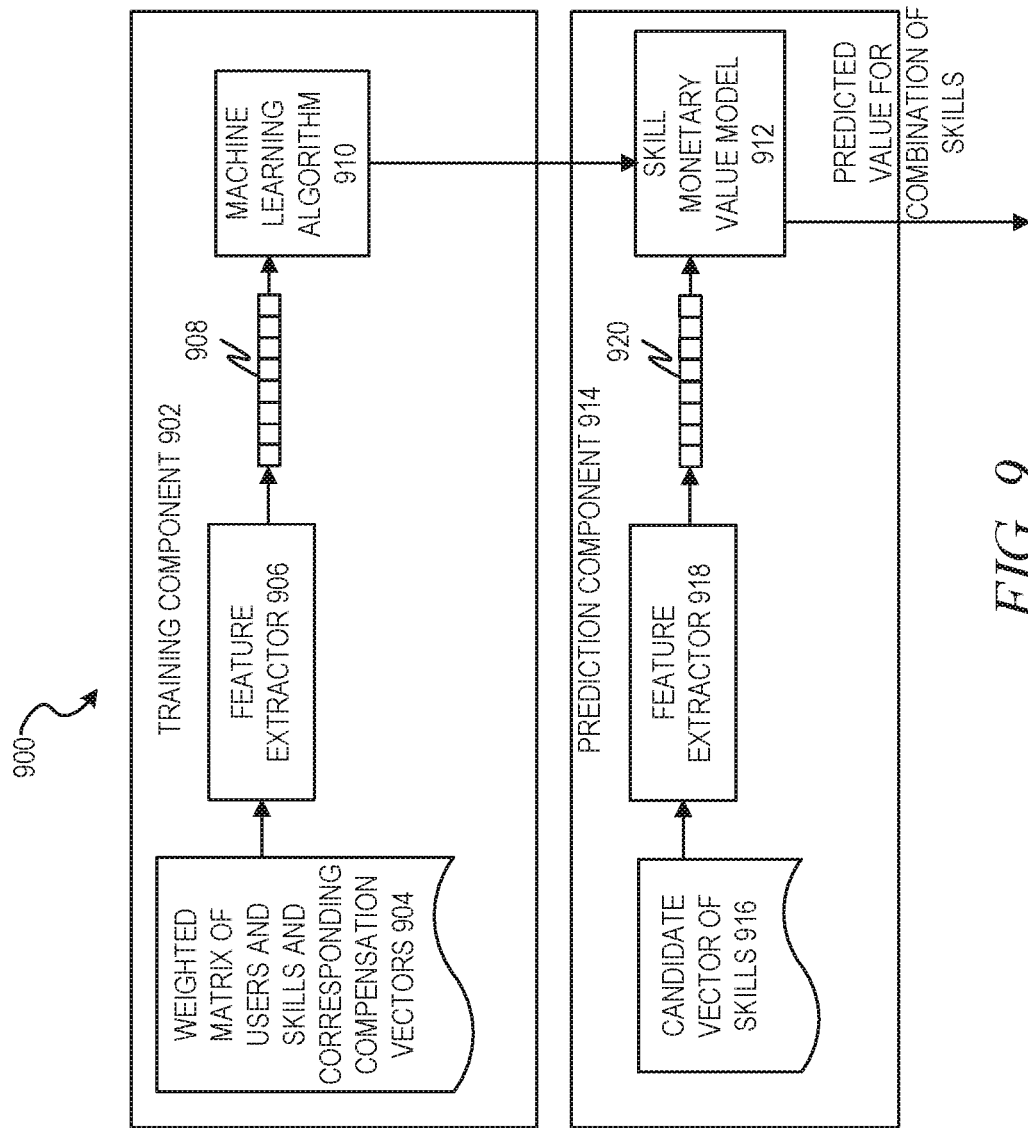
FIG. 9 is a block diagram illustrating a machine learning algorithm component, in accordance with an example embodiment.

FIG. 9 is a block diagram illustrating a machine learning algorithm component 900, in accordance with an example embodiment. In some example embodiments, the machine learning algorithm component 900 may be located on the confidential data backend 106.

In a training component 902, a weighted matrix of users and skills and corresponding compensation vectors 904 is fed to a feature extractor 906, which acts to extract curated features 908 from the weighted matrix of users and skills and corresponding compensation vectors 904.

Thus, for example, the feature extractor 906 may extract features such as skill co-occurrence from the weighted matrix of users and skills and corresponding compensation vectors 904. Extraction may be performed via a number of different extraction techniques. In an embodiment, the features may be directly extracted from the weighted matrix of users and skills and corresponding compensation vectors 904. In other example embodiments, more complex transformations and/or pre-processing may be performed, such as mapping of the data in the weighted matrix of users and skills and corresponding compensation vectors 904 to social network attribute taxonomy categories.

The curated features 908 may be fed to a machine learning algorithm 910. The machine learning algorithm 910 then trains a skill monetary value model 912 based on the curated features 908. The machine learning algorithm 910 may be selected from among many different potential supervised or unsupervised machine learning algorithms. Examples of supervised machine learning algorithms include artificial neural networks, Bayesian networks, instance-based learning, support vector machines, random forests, linear classifiers, quadratic classifiers, k-nearest neighbor, decision trees, and hidden Markov models. Examples of unsupervised machine learning algorithms include expectation-maximization algorithms, vector quantization, and information bottleneck methods. In an example embodiment, a binary logistic regression model is used. Binary logistic regression deals with situations in which the observed outcome for a dependent variable can have only two possible types. Logistic regression is used to predict the odds of one case or the other being true based on values of independent variables (predictors).

Specifically, the skill monetary value model 912 may be trained to output a predicted compensation for a given combination of skills. In some example embodiments, the predicted compensation may include a confidence score so that subsequent processing can, if desired, weight the value of the prediction accordingly.

In a prediction component 914, a candidate vector of a combination of skills 916 is fed to a feature extractor 918, which acts to extract curated features 920 from the candidate vector of a combination of skills 916. The curated features 920 are then used as input to the trained skill monetary value model 912, which outputs a predicted compensation, which can be used to calculate a value for the addition of a set of skills. For example, if a user having skills A, B, and C has a predicted compensation of X, and a user having skills A, B, C, and D has a predicted compensation of Y, then the value of skill D for this user would be Y-X.

It should be noted that while the feature extractor 906 and the feature extractor 918 are depicted as separate components, they may be the same component in some example embodiments. Additionally, a large number of different types of features could be extracted using the feature extractors 906 and 918. Furthermore, while in an example embodiment the features extracted by the feature extractor 906 are the same as the features extracted by the feature extractor 918, in other example embodiments there may be differences in the features.

Figure 10:
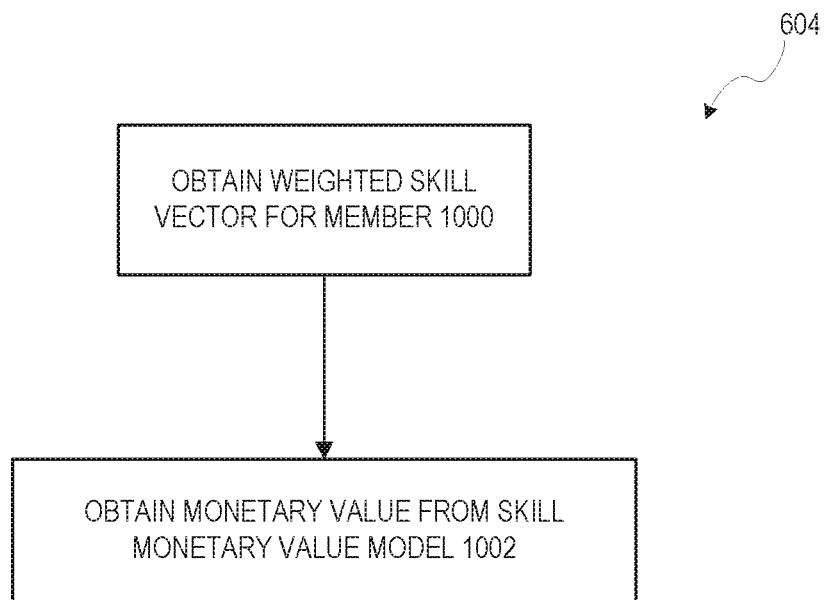
FIG. 10 is a flow diagram illustrating a method of recommending most-valuable skills for a member of a social networking service, in accordance with an example embodiment.

FIG. 10 is a flow diagram illustrating a method 604 of recommending most-valuable skills for a member of a social networking service, in accordance with an example embodiment. Here, at operation 1000, the weighted skill vector y (u) for member u is obtained. Then, for each skill c in a taxonomy of skills, S(u, c) denotes the weighted vector obtained by combining y (u) with skill c. At operation 1002, a monetary value S is obtained from the skill monetary value model by feeding the skill monetary value model the weighted vector S(u, c) obtained by combining y (u) with skill c. This combination may be performed in a number of different ways. In one example embodiment, it is presumed the member lacks the skill entirely and thus the combination involves adding an average weight for skill c (or alternatively the actual weight assigned to skill c for the course in question) to the (zero) skill c field of the member's weighted skill vector. In another example embodiment, scenarios where the member already has some proficiency in the skill c are handled by applying a function to the weight assigned to skill c, where the function takes into account the existing member's proficiency. For example, the function may reduce the weight assigned to skill c proportionally to the member's existing score for skill c, under the assumption that a member already proficient in a skill will not gain as much benefit from a course teaching that skill as a novice.

This may be repeated for a plurality of different possible skills c to recommend. In some example embodiments, this may be repeated for every skill c in the taxonomy that is not in y (u) for member u. The skills having the top n monetary values can then be presented to the member. In some example embodiments, the monetary values can also be presented to the member (e.g., Java skill has a monetary value of $15,000, Photoshop skill has a monetary value of $5,000, etc.). In some example embodiments, the costs of obtaining the corresponding skills can be analyzed and compared to the monetary values to present to the member the skills that offer the best "bang for the buck" for the member to improve. For example, the Java skill may have a monetary value of $15,000 but courses to acquire the Java skill may cost $12,000, whereas the Photoshop skill may have a monetary value of $5,000 but a course to acquire the Photoshop skill may only cost $500, thus making the Photoshop skill a better recommendation to improve.

Additionally, in some example embodiments, clusters or groupings of skills to be learned may be analyzed and/or recommended. For example, rather than providing members only with recommendations of single skills that add the most value, the system can provide members with recommendations of groupings of additional skills that together can add significant value. Thus, instead of recommending a Java course alone, the system may recommend a course that teaches both Java and web programming.

Using the member's current combination of skills to predict the value of additional skills aids in the technical problem encountered when members having a lot of skills add additional skills. Specifically, there may or may not be a diminishing return for additional skills within a particular general skill set. For example, a computer programmer who has skills indicating fluency in ten different computer languages may not gain as much by adding an eleventh language as someone who has fluency in only one computer language would gain by adding a second. On the other hand, for a surgeon who has ten surgery skills, learning an eleventh skill may indeed still add a lot of a value. Furthermore, skills learned outside of a current area of expertise may add significant value. Example embodiments as described above correct for this (and other) artifacts of combinations of skills.

Figure 11:
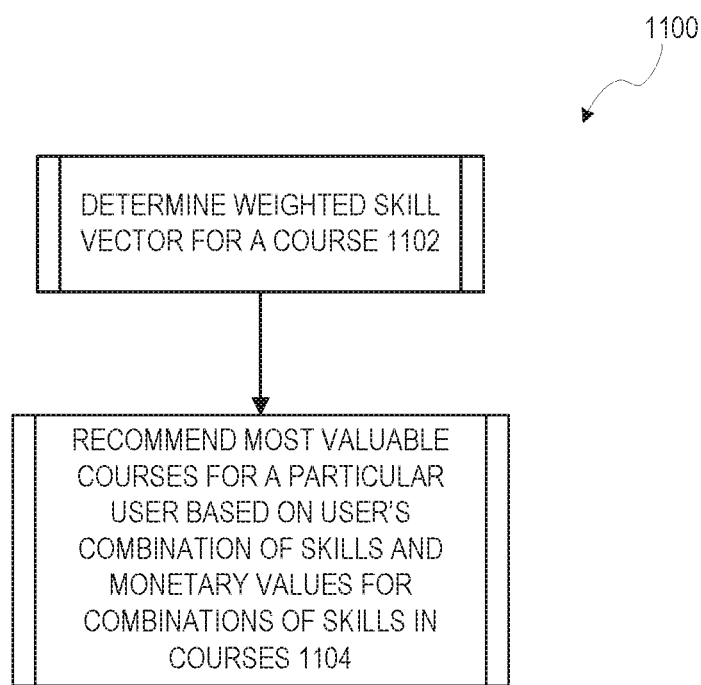
FIG. 11 is a flow diagram illustrating a method of determining a course to recommend to a user from a monetary value for a weighted combination of skills, in accordance with an example embodiment.

As described above, the monetary value for a weighted combination of skills can be used to determine the value of taking a particular course (which adds particular skills). FIG. 11 is a flow diagram illustrating a method 1100 of determining a course to recommend to a user from a monetary value for a weighted combination of skills, in accordance with an example embodiment. At operation 1102, a weighted skill vector for a course is determined. The idea here is that machine learning techniques can be trained to determine which skills the course provides. Then, at operation 1104, most-valuable courses for a particular user having a weighted combination of skills are recommended.

Figure 12:
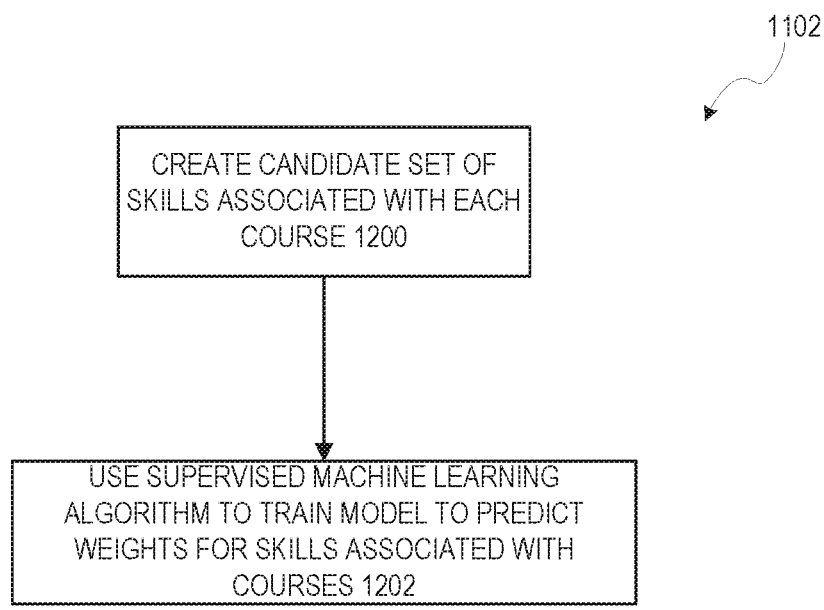
FIG. 12 is a flow diagram illustrating a method of determining a weighted skill vector, in accordance with an example embodiment.

FIG. 12 is a flow diagram illustrating a method 1102 of determining a weighted skill vector, in accordance with an example embodiment. The goal is to associate a weight w(x, c) of a plurality of courses x for imparting a skill c. At operation 1200, for each course x, a candidate set of skills associated with the course is created. This candidate set may be created using a number of techniques. In one example embodiment, the course provider for each course provides a list of the skills that each course is intended to provide. Of course, not every skill that is listed by a course provider has the same impact, nor are they always even accurate. As such, at operation 1202 a supervised machine learning algorithm is used to train a model to predict weights for skills associated with courses.

Figure 13:
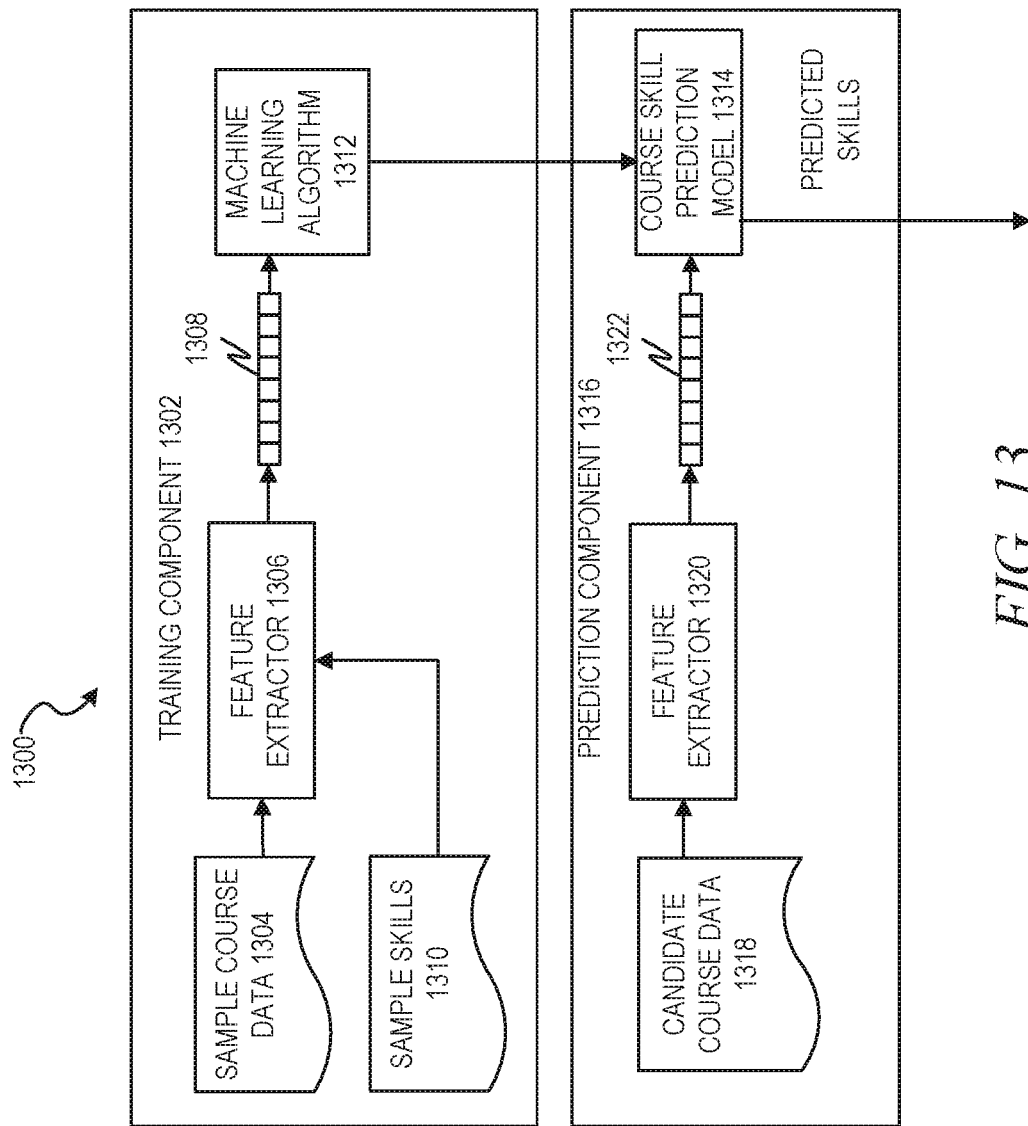
FIG. 13 is a block diagram illustrating a second machine learning algorithm component, in accordance with an example embodiment.

FIG. 13 is a block diagram illustrating a second machine learning algorithm component 1300, in accordance with an example embodiment. In some example embodiments, the second machine learning algorithm component 1300 may be located on the confidential data backend 106.

In a training component 1302, sample course data 1304 is fed to a feature extractor 1306, which acts to extract curated features 1308 from the sample course data 1304. The sample course data 1304 may include course descriptions and metadata provided by a course provider, as well as public information ascertained about the course (such as via web searches based on instructor, course materials, etc.). Also fed to the feature extractor 1306 are sample skills 1310. The sample skills 1310 may include all skills, or may be a subset of skills believed to be relevant to the courses in the sample course data 1304. The curated features 1308 extracted by the feature extractor 1306 may include course-only features as well as skill-course pair features. Examples of course-only features include, but are not limited to, reputation of the author of the course (e.g., average rating of the author), popularity of the author of the course (e.g., number of views of courses by the author), total number of courses created by the author of the course, any of the above features restricted to the recent past, any of the above features for the organization associated with the course, popularity of the course (e.g., number of views, popularity of the course within the last n days, or trend/change in the popularity of the course), rating of the course, quality of the course videos (e.g., whether professionally created, screencapture vs. shot with a camera, whether animation is used, etc.), quality of the course audio, and quality of the course transcript (e.g., readability index). Examples of skill-course pair features include, but are not limited to, whether the skill (or related skills) has been listed by the author under objectives of the course; occurrence-based features for the skill (or related skills) in the course; user feedback signals such as click-through-rate for the given course when users search for courses related the skill, average user rating, endorsements, and the rate or number of users pinning or sharing the course for the given skill; as well as time-based versions of the above features, such as one or more of the features based only on recent data (e.g., within the last month).

Extraction may be performed via a number of different extraction techniques. In an embodiment, the features may be directly extracted from the sample course data 1304 and sample skills 1310. The sample course data 1304, for example, could include metadata storing information relevant to determination of the features, such as the rating of the course. In other example embodiments, more complex transformations and/or pre-processing may be performed, such as calculation of various metrics based on the sample course data 1304, sample skills 1310, and member usage information.

The curated features 1308 may be fed to a machine learning algorithm 1312. The machine learning algorithm 1312 then trains a course skill prediction model 1314 based on the curated features 1308. The machine learning algorithm 1312 may be selected from among many different potential supervised or unsupervised machine learning algorithms. Examples of supervised machine learning algorithms include artificial neural networks, Bayesian networks, instance-based learning, support vector machines, random forests, linear classifiers, quadratic classifiers, k-nearest neighbor, decision trees, and hidden Markov models. Examples of unsupervised machine learning algorithms include expectation-maximization algorithms, vector quantization, and information bottleneck methods. In an example embodiment, a binary logistic regression model is used. Binary logistic regression deals with situations in which the observed outcome for a dependent variable can have only two possible types. Logistic regression is used to predict the odds of one case or the other being true based on values of independent variables (predictors).

Specifically, the course skill prediction model 1314 may be trained to output a predicted set of skills taught by a course. In some example embodiments, the predicted set of skills may include confidence scores for each skill so that subsequent processing can, if desired, weight the value of the predictions accordingly.

In a prediction component 1316, candidate course data 1318 is fed to a feature extractor 1320, which acts to extract curated features 1322 from the candidate course data 1318. The curated features 1322 are then used as input to the course skill prediction model 1314, which outputs a predicted skill set for the course It should be noted that while the feature extractor 1306 and the feature extractor 1320 are depicted as separate components, they may be the same component in some example embodiments. Additionally, a large number of different types of features could be extracted using the feature extractors 1306 and 1320. Furthermore, while in an example embodiment the features extracted by the feature extractor 1306 are the same as the features extracted by the feature extractor 1320, in other example embodiments there may be differences in the features.

Figure 14:
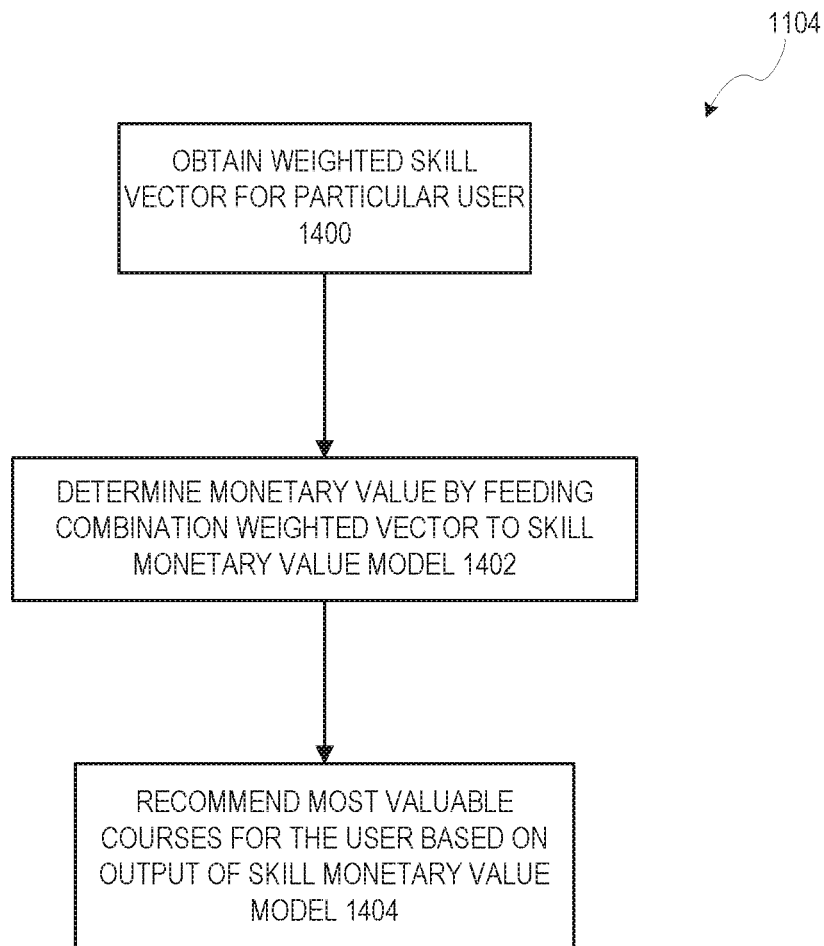
FIG. 14 is a flow diagram illustrating a method for recommending most-valuable courses for a particular user having a weighted combination of skills, in accordance with an example embodiment.

FIG. 14 is a flow diagram illustrating a method 1104 for recommending most-valuable courses for a particular user having a weighted combination of skills, in accordance with an example embodiment. At operation 1400, a weighted skill vector for the particular user is obtained. For each course x from the available set of courses, let S(u,x) denote the monetary value of a combination weighted vector obtained by combining the weighted skill vector of the user u with the weighted skill vector associated with the course, as output by the skill monetary value model from operation 1102. At operation 1402, the monetary value may be determined by feeding the combination weighted vector to the skill monetary value model 912 of FIG. 9. At operation 1404, the most-valuable courses for the user are recommended, based on the S(u,x) scores determined in operation 1402. Alternatively, an even more complicated calculation can be performed where the cost of each course (in money, time, or any combination thereof) may be subtracted from the S(u,x) score for each course, and the difference used to recommend courses with the most "bang for the buck."

Figure 15:
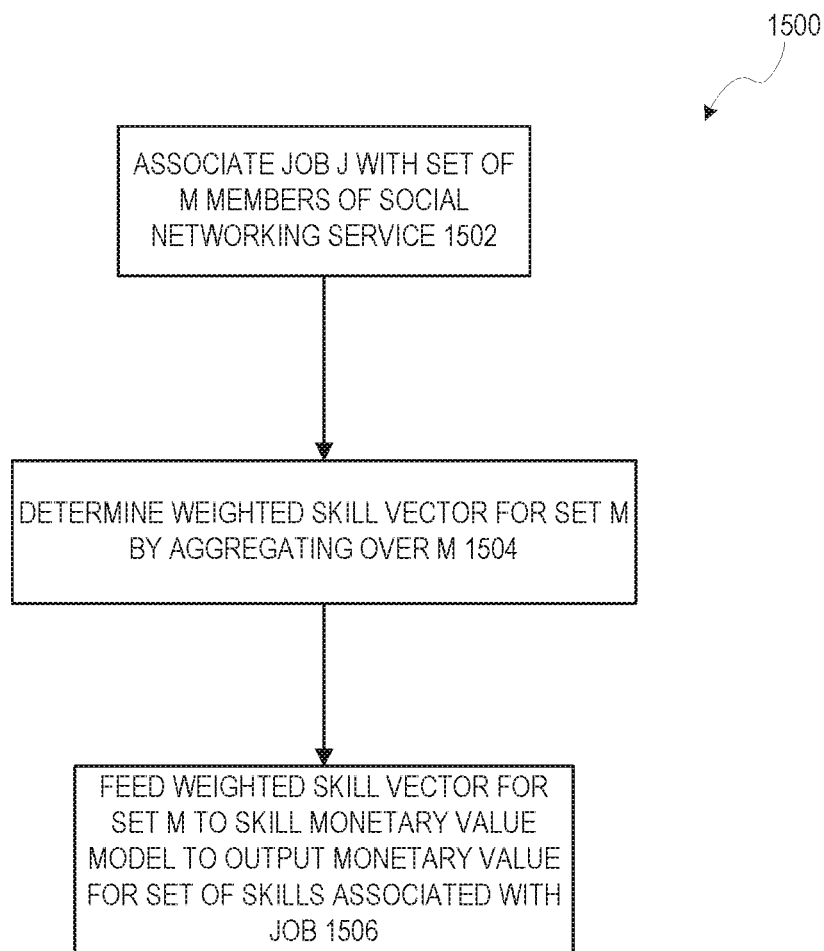
FIG. 15 is a flow diagram illustrating a method of associating a monetary value for a job, in accordance with a first example embodiment.

In another example embodiment, the skill monetary value model 912 is utilized to associate a monetary value for a job based on skills associated with the job. FIG. 15 is a flow diagram illustrating a method 1500 of associating a monetary value for a job in accordance with a first example embodiment. At operation 1502, a job j is associated with a set M of members of a social networking service. This operation may be performed based on any combination of a variety of techniques. First, M may include any member who shares a title with the job and is located in the same location as the job. Second, M may include any member who shares a title with the job, is located in the same location as the job, and is in the same industry as the job. Third, M may include any member who shares a title with the job, is located in the same location as the job, and works at the same company as the job. Fourth, M may include any member who has viewed the job on the social networking service. Fifth, M may include any member who has applied to the job on the social networking service.

No matter how M is determined, at operation 1504, a weighted skill vector is determined for the set M by aggregating over M. This aggregation may be in the form of, for example, a weighted mean, median, etc., where the weights could be based on the extent of the match of the member to the job.

Then, at operation 1506, the weighted skill vector for the set M is fed to the skill monetary value model 912 to output a monetary value for the set of skills associated with the job.

Figure 16:
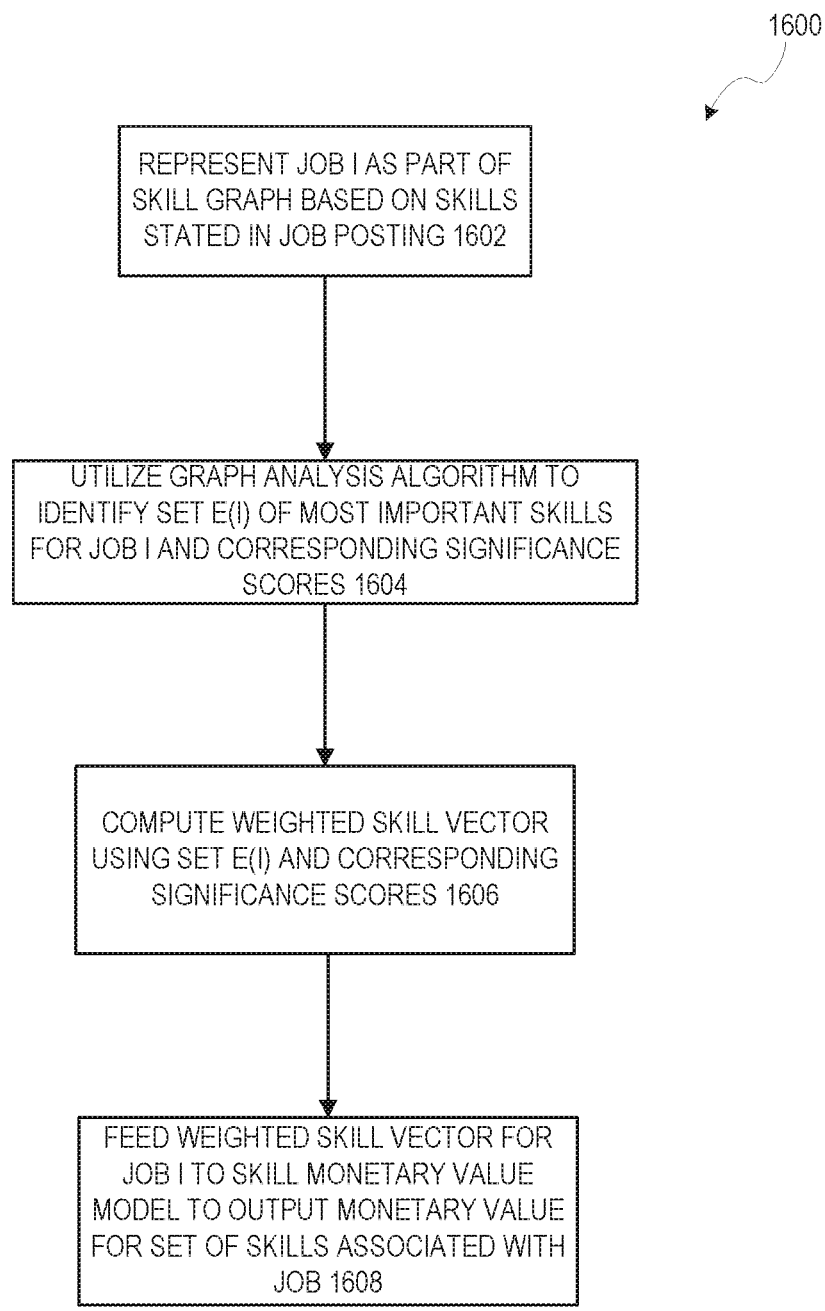
FIG. 16 is a flow diagram illustrating a method of associating a monetary value for a job, in accordance with a second example embodiment.

FIG. 16 is a flow diagram illustrating a method 1600 of associating a monetary value for a job, in accordance with a second example embodiment. At operation 1602, a job i is represented as part of a skill graph based on skills stated in the job posting. Then, at operation 1604, a graph analysis algorithm such as PageRank is utilized to identify the set E(i) of most-important skills for job i along with corresponding significance scores. For example, PageRank may be used to determine a centrality score $\varphi$ (u, c) of each skill c, and then boosting this score based on the endorsement score, endscore (u, c), where f' ( . . . ) is a monotonically increasing function in two variables such as f'(x, y)=xy, or f'(x,y)=x exp(y). This utilizes not just the endorsements but also a measure of how authoritative the endorsers are. At operation 1606, a weighted skill vector may be computed using the set E(i) of most-important skills for job i and the corresponding significance scores. This weighted skill vector may contain a field corresponding to each skill in E(i), with the value in each of these fields being the significance score for the corresponding skill. At operation 1608, the weighted skill vector for job i is fed to the skill monetary value model 912 to output a monetary value for the set of skills associated with the job.

It should be noted that in either operation 1506 or operation 1608, the skill monetary value model 912 could have been trained using only the set of jobs which contain compensation information, listed as part of a structured job posting. That is, rather than submitted confidential data from users, actual published compensation amounts for job postings could be used to train the skill monetary value model 912.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-16 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Software Architecture

Figure 17:
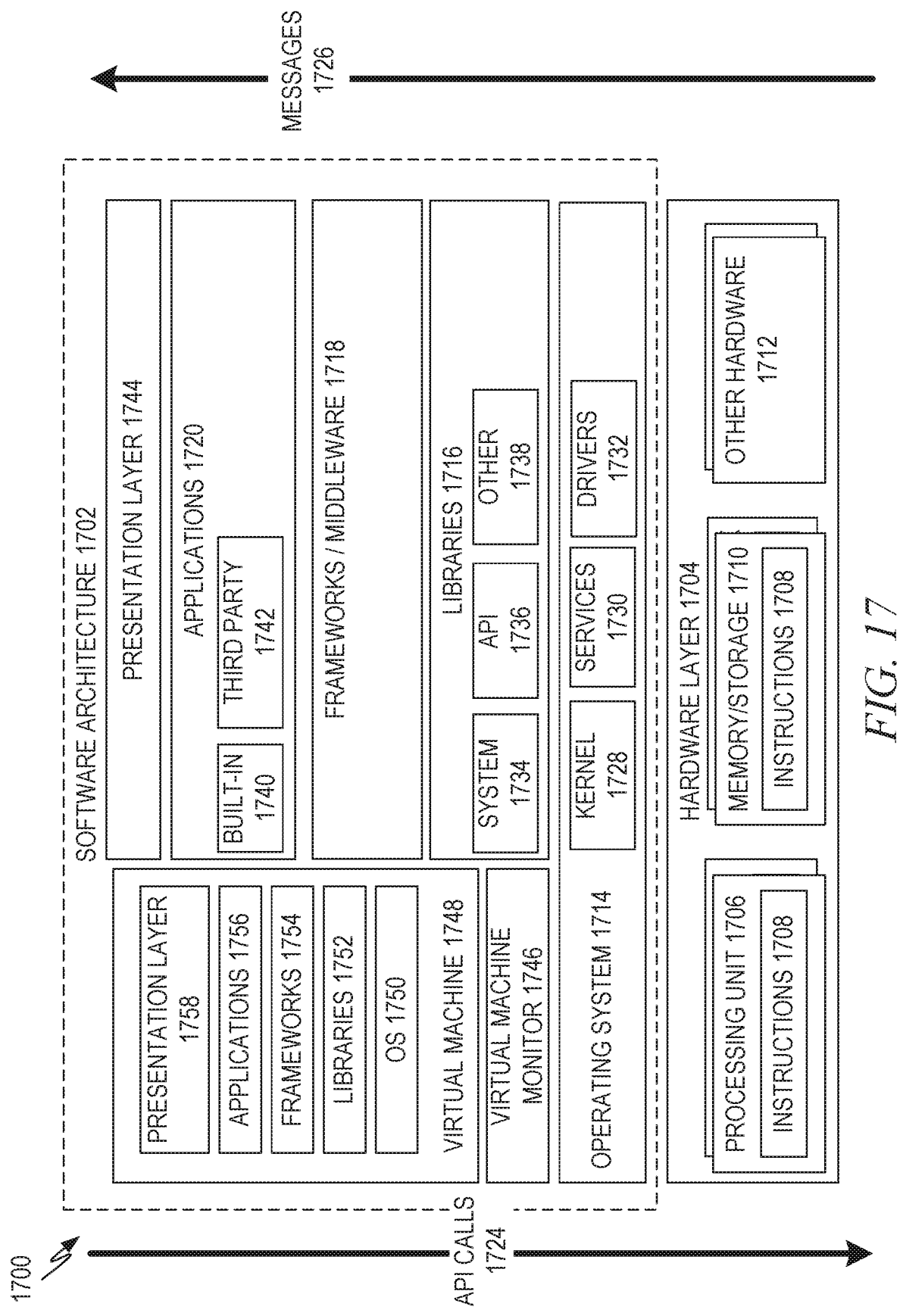
FIG. 17 is a block diagram illustrating a representative software architecture, which may be used in conjunction with various hardware architectures herein described, in accordance with an example embodiment.

FIG. 17 is a block diagram 1700 illustrating a representative software architecture 1702, which may be used in conjunction with various hardware architectures herein described. FIG. 17 is merely a non-limiting example of a software architecture, and it will be appreciated that many other architectures may be implemented to facilitate the functionality described herein. The software architecture 1702 may be executing on hardware such as a machine 1800 of FIG. 18 that includes, among other things, processors 1810, memory/storage 1830, and I/O components 1850. A representative hardware layer 1704 is illustrated and can represent, for example, the machine 1800 of FIG. 18. The representative hardware layer 1704 comprises one or more processing units 1706 having associated executable instructions 1708. The executable instructions 1708 represent the executable instructions of the software architecture 1702, including implementation of the methods, modules, and so forth of FIGS. 1-16. The hardware layer 1704 also includes memory and/or storage modules 1710, which also have the executable instructions 1708. The hardware layer 1704 may also comprise other hardware 1712, which represents any other hardware of the hardware layer 1704, such as the other hardware illustrated as part of the machine 1800.

In the example architecture of FIG. 17, the software architecture 1702 may be conceptualized as a stack of layers where each layer provides particular functionality. For example, the software architecture 1702 may include layers such as an operating system 1714, libraries 1716, frameworks/middleware 1718, applications 1720, and a presentation layer 1744. Operationally, the applications 1720 and/or other components within the layers may invoke API calls 1724 through the software stack and receive responses, returned values, and so forth, illustrated as messages 1726, in response to the API calls 1724. The layers illustrated are representative in nature and not all software architectures have all layers. For example, some mobile or special-purpose operating systems may not provide a layer of frameworks/middleware 1718, while others may provide such a layer. Other software architectures may include additional or different layers.

The operating system 1714 may manage hardware resources and provide common services. The operating system 1714 may include, for example, a kernel 1728, services 1730, and drivers 1732. The kernel 1728 may act as an abstraction layer between the hardware and the other software layers. For example, the kernel 1728 may be responsible for memory management, processor management (e.g., scheduling), component management, networking, security settings, and so on. The services 1730 may provide other common services for the other software layers. The drivers 1732 may be responsible for controlling or interfacing with the underlying hardware. For instance, the drivers 1732 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1716 may provide a common infrastructure that may be utilized by the applications 1720 and/or other components and/or layers. The libraries 1716 typically provide functionality that allows other software modules to perform tasks in an easier fashion than by interfacing directly with the underlying operating system 1714 functionality (e.g., kernel 1728, services 1730, and/or drivers 1732). The libraries 1716 may include system libraries 1734 (e.g., C standard library) that may provide functions such as memory allocation functions, string manipulation functions, mathematical functions, and the like. In addition, the libraries 1716 may include API libraries 1736 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1716 may also include a wide variety of other libraries 1738 to provide many other APIs to the applications 1720 and other software components/modules.

The frameworks 1718 (also sometimes referred to as middleware) may provide a higher-level common infrastructure that may be utilized by the applications 1720 and/or other software components/modules. For example, the frameworks 1718 may provide various graphic user interface (GUI) functions, high-level resource management, high-level location services, and so forth. The frameworks 1718 may provide a broad spectrum of other APIs that may be utilized by the applications 1720 and/or other software components/modules, some of which may be specific to a particular operating system or platform.

The applications 1720 include built-in applications 1740 and/or third-party applications 1742. Examples of representative built-in applications 1740 may include, but are not limited to, a contacts application, a browser application, a book reader application, a location application, a media application, a messaging application, and/or a game application. The third-party applications 1742 may include any of the built-in applications 1740 as well as a broad assortment of other applications. In a specific example, the third-party application 1742 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 1742 may invoke the API calls 1724 provided by the mobile operating system such as the operating system 1714 to facilitate functionality described herein.

The applications 1720 may utilize built-in operating system 1714 functions (e.g., kernel 1728, services 1730, and/or drivers 1732), libraries 1716 (e.g., system libraries 1734, API libraries 1736, and other libraries 1738), and frameworks/middleware 1718 to create user interfaces to interact with users of the system. Alternatively, or additionally, in some systems, interactions with a user may occur through a presentation layer, such as the presentation layer 1744. In these systems, the application/module "logic" can be separated from the aspects of the application/module that interact with a user.

Some software architectures utilize virtual machines. In the example of FIG. 17, this is illustrated by a virtual machine 1748. A virtual machine creates a software environment where applications/modules can execute as if they were executing on a hardware machine (such as the machine 1800 of FIG. 18, for example). A virtual machine is hosted by a host operating system (e.g., operating system 1714 in FIG. 17) and typically, although not always, has a virtual machine monitor 1746, which manages the operation of the virtual machine 1748 as well as the interface with the host operating system (e.g., operating system 1714). A software architecture executes within the virtual machine 1748, such as an operating system 1750, libraries 1752, frameworks/middleware 1754, applications 1756, and/or a presentation layer 1758. These layers of software architecture executing within the virtual machine 1748 can be the same as corresponding layers previously described or may be different.

Example Machine Architecture and
Machine-Readable Medium

Figure 18:
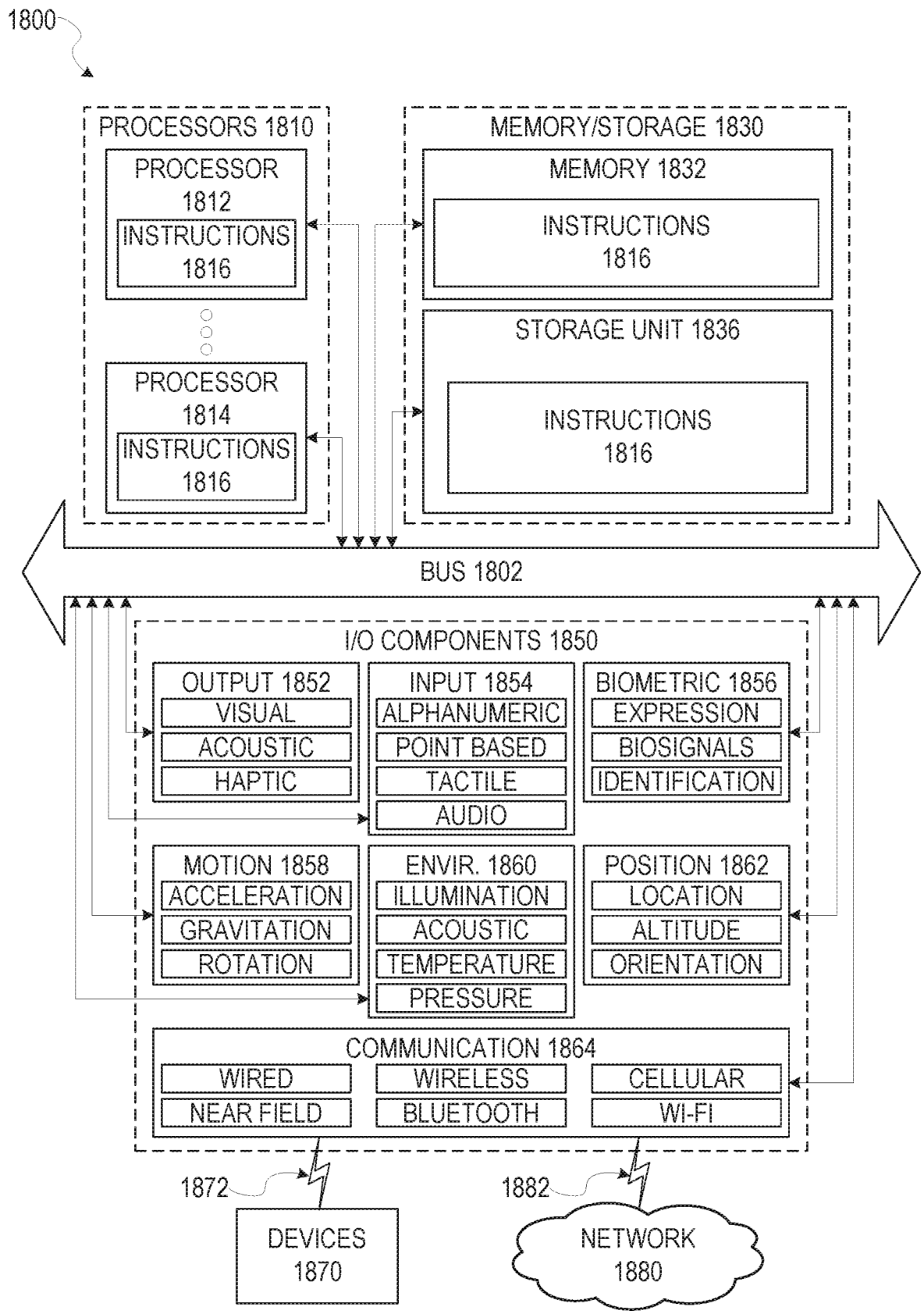
FIG. 18 is a block diagram illustrating components of a machine, according to some example embodiments, able to read instructions from a machine-readable medium (e.g., a machine-readable storage medium) and perform any one or more of the methodologies discussed herein.

FIG. 18 is a block diagram illustrating components of a machine 1800, according to some example embodiments, able to read instructions from a machine-readable medium (e.g., a machine-readable storage medium) and perform any one or more of the methodologies discussed herein. Specifically, FIG. 18 shows a diagrammatic representation of the machine 1800 in the example form of a computer system, within which instructions 1816 (e.g., software, a program, an application, an applet, an app, or other executable code) for causing the machine 1800 to perform any one or more of the methodologies discussed herein may be executed. The instructions transform the general, non-programmed machine into a particular machine programmed to carry out the described and illustrated functions in the manner described. In alternative embodiments, the machine 1800 operates as a standalone device or may be coupled (e.g., networked) to other machines. In a networked deployment, the machine 1800 may operate in the capacity of a server machine or a client machine in a server-client network environment, or as a peer machine in a peer-to-peer (or distributed) network environment. The machine 1800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1816, sequentially or otherwise, that specify actions to be taken by the machine 1800. Further, while only a single machine 1800 is illustrated, the term "machine" shall also be taken to include a collection of machines 1800 that individually or jointly execute the instructions 1816 to perform any one or more of the methodologies discussed herein.

The machine 1800 may include processors 1810, memory/storage 1830, and I/O components 1850, which may be configured to communicate with each other such as via a bus 1802. In an example embodiment, the processors 1810 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1812 and a processor 1814 that may execute the instructions 1816. The term "processor" is intended to include multi-core processors that may comprise two or more independent processors (sometimes referred to as "cores") that may execute the instructions 1816 contemporaneously. Although FIG. 18 shows multiple processors 1810, the machine 1800 may include a single processor with a single core, a single processor with multiple cores (e.g., a multi-core processor), multiple processors with a single core, multiple processors with multiples cores, or any combination thereof.

The memory/storage 1830 may include a memory 1832, such as a main memory, or other memory storage, and a storage unit 1836, both accessible to the processors 1810 such as via the bus 1802. The storage unit 1836 and memory 1832 store the instructions 1816 embodying any one or more of the methodologies or functions described herein. The instructions 1816 may also reside, completely or partially, within the memory 1832, within the storage unit 1836, within at least one of the processors 1810 (e.g., within the processor's cache memory), or any suitable combination thereof, during execution thereof by the machine 1800. Accordingly, the memory 1832, the storage unit 1836, and the memory of the processors 1810 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 1816. The term "machine-readable medium" shall also be taken to include any medium, or combination of multiple media, that is capable of storing instructions (e.g., instructions 1816) for execution by a machine (e.g., machine 1800), such that the instructions, when executed by one or more processors of the machine (e.g., processors 1810), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1850 may include a wide variety of components to receive input, provide output, produce output, transmit information, exchange information, capture measurements, and so on. The specific I/O components 1850 that are included in a particular machine will depend on the type of machine. For example, portable machines such as mobile phones will likely include a touch input device or other such input mechanisms, while a headless server machine will likely not include such a touch input device. It will be appreciated that the I/O components 1850 may include many other components that are not shown in FIG. 18. The I/O components 1850 are grouped according to functionality merely for simplifying the following discussion and the grouping is in no way limiting. In various example embodiments, the I/O components 1850 may include output components 1852 and input components 1854. The output components 1852 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1850 may include biometric components 1856, motion components 1858, environmental components 1860, or position components 1862, among a wide array of other components. For example, the biometric components 1856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1858 may include acceleration sensor components (e.g., accelerometer), gravitation sensor components, rotation sensor components (e.g., gyroscope), and so forth. The environmental components 1860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1862 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1850 may include communication components 1864 operable to couple the machine 1800 to a network 1880 or devices 1870 via a coupling 1882 and a coupling 1872, respectively. For example, the communication components 1864 may include a network interface component or other suitable device to interface with the network 1880. In further examples, the communication components 1864 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1870 may be another machine or any of a wide variety of peripheral devices (e.g., a peripheral device coupled via a USB).

Moreover, the communication components 1864 may detect identifiers or include components operable to detect identifiers. For example, the communication components 1864 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1864, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 1880 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1880 or a portion of the network 1880 may include a wireless or cellular network and the coupling 1882 may be a Code Division Multiple Access (CDMA) connection, a Global System for Mobile communications (GSM) connection, or another type of cellular or wireless coupling. In this example, the coupling 1882 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1816 may be transmitted or received over the network 1880 using a transmission medium via a network interface device (e.g., a network interface component included in the communication components 1864) and utilizing any one of a number of well-known transfer protocols (e.g., Hypertext Transfer Protocol (HTTP)). Similarly, the instructions 1816 may be transmitted or received using a transmission medium via the coupling 1872 (e.g., a peer-to-peer coupling) to the devices 1870. The term "transmission medium" shall be taken to include any intangible medium that is capable of storing, encoding, or carrying the instructions 1816 for execution by the machine 1800, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
a processor;
a computer-readable medium having instructions stored thereon, which, when executed by the processor, cause the system to:
map each of a plurality of members of a social networking service to a weighted skill vector, each weighted skill vector including a list of skills for the member with an associated weight indicating a strength of the skill;
aggregate members of the social networking service who belong to an industry to obtain a weighted matrix of members and skills along with compensation vectors indicating compensation for each of the members in the matrix,
the weighted matrix being one of a plurality of weighted matrices with each weighted matrix in the plurality of weighted matrices corresponding to a different industry;
use the weighted matrix of members and skills and corresponding compensation vectors to train a machine learning skill monetary value prediction model to output a predicted monetary value for a skill contained in a candidate vector fed to the machine learning skill monetary value prediction model; and
provide a recommendation to a member of one or more skills, which the member not currently have, to add based on output of the machine learning skill monetary value prediction model.

2. The system of claim 1, wherein the providing the recommendation includes ranking skills based on the predicted monetary values output by the machine learning skill monetary value prediction model.

3. The system of claim 1, wherein the compensation vectors are created using confidential information submitted by members of the social networking service in exchange for providing the recommendation.

4. The system of claim 1, wherein the list of skills for the member is generated by using a graph analysis algorithm based on endorsement scores for skills listed by the member in a member profile.

5. The system of claim 4, wherein the list of skills for the member is extended by adding inferred skills based on commonly co-occurring skills with the skills listed by the member in the member profile.

6. The system of claim 4, wherein the weighted matrix is reduced using a dimensionality reduction technique.

7. The system of claim 1, wherein the providing of the recommendation includes displaying the predicted monetary value for each recommended skill.

8. A method comprising:
mapping each of a plurality of members of a social networking service to a weighted skill vector, each weighted skill vector including a list of skills for the member with an associated weight indicating a strength of the skill;
aggregating members of the social networking service who belong to an industry to obtain a weighted matrix of members and skills along with compensation vectors indicating compensation for each of the members in the matrix,
the weighted matrix being one of a plurality of weighted matrices with each weighted matrix in the plurality of weighted matrices corresponding to a different industry;
using the weighted matrix of members and skills and corresponding compensation vectors to train a machine learning skill monetary value prediction model to output a predicted monetary value for a skill contained in a candidate vector fed to the machine learning skill monetary value prediction model; and
providing a recommendation to a member of one or more skills, which the member not currently have, to add based on output of the machine learning skill monetary value prediction model.

9. The method of claim 8, wherein the providing the recommendation includes ranking skills based on the predicted monetary values output by the machine learning skill monetary value prediction model.

10. The method of claim 8, wherein the compensation vectors are created using confidential information submitted by members of the social networking service in exchange for providing the recommendation.

11. The method of claim 8, wherein the list of skills for the member is generated by using a graph analysis algorithm based on endorsement scores for skills listed by the member in a member profile.

12. The method of claim 11, wherein the list of skills for the member is extended by adding inferred skills based on commonly co-occurring skills with the skills listed by the member in the member profile.

13. The method of claim 11, wherein the weighted matrix is reduced using a dimensionality reduction technique.

14. The method of claim 8, wherein the providing of the recommendation includes displaying the predicted monetary value for each recommended skill.

15. A non-transitory machine-readable storage medium comprising instructions, which when implemented by one or more machines, cause the one or more machines to perform operations comprising:
mapping each of a plurality of members of a social networking service to a weighted skill vector, each weighted skill vector including a list of skills for the member with an associated weight indicating a strength of the skill;
aggregating members of the social networking service who belong to an industry to obtain a weighted matrix of members and skills along with compensation vectors indicating compensation for each of the members in the matrix,
the weighted matrix being one of a plurality of weighted matrices with each weighted matrix in the plurality of weighted matrices corresponding to a different industry;
using the weighted matrix of members and skills and corresponding compensation vectors to train a machine learning skill monetary value prediction model to output a predicted monetary value for a skill contained in a candidate vector fed to the machine learning skill monetary value prediction model; and
providing a recommendation to a member of one or more skills, which the member not currently have, to add based on output of the machine learning skill monetary value prediction model.

16. The non-transitory machine-readable storage medium of claim 15, wherein the providing the recommendation includes ranking skills based on the predicted monetary values output by the machine learning skill monetary value prediction model.

17. The non-transitory machine-readable storage medium of claim 15, wherein the compensation vectors are created using confidential information submitted by members of the social networking service in exchange for providing the recommendation.

18. The non-transitory machine-readable storage medium of claim 15, wherein the list of skills for the member is generated by using a graph analysis algorithm based on endorsement scores for skills listed by the member in a member profile.

19. The non-transitory machine-readable storage medium of claim 18, wherein the list of skills for the member is extended by adding inferred skills based on commonly co-occurring skills with the skills listed by the member in the member profile.

20. The non-transitory machine-readable storage medium of claim 18, wherein the weighted matrix is reduced using a dimensionality reduction technique.

* * * * *